(12) United States Patent
Urbach et al.

(10) Patent No.: US 10,976,919 B2
(45) Date of Patent: Apr. 13, 2021

(54) HYBRID GESTURES FOR VISUALIZATIONS

(71) Applicant: SAP SE, Walldorf (DE)

(72) Inventors: Ryan Urbach, Vista, CA (US); Brian Mantuano, San Marcos, CA (US); Damia Ferrer Biosca, Oceanside, CA (US); Brianna Huxtable, Vancouver (CA); Nathaniel Gray, San Diego, CA (US); Santiago Becerra, Del Mar, CA (US)

(73) Assignee: SAP SE, Walldorf (DE)

( * ) Notice: Subject to any disclaimer, the term of this patent is extended or adjusted under 35 U.S.C. 154(b) by 83 days.

(21) Appl. No.: 15/705,181

(22) Filed: Sep. 14, 2017

(65) Prior Publication Data
US 2019/0079664 A1  Mar. 14, 2019

(51) Int. Cl.
| | | |
|---|---|---|
| *G06F 3/0488* | (2013.01) | |
| *G06F 3/0482* | (2013.01) | |
| *G06T 11/20* | (2006.01) | |
| *G06F 3/0486* | (2013.01) | |
| *G06F 3/0485* | (2013.01) | |

(52) U.S. Cl.
CPC ........ *G06F 3/04883* (2013.01); *G06F 3/0482* (2013.01); *G06F 3/0485* (2013.01); *G06F 3/0486* (2013.01); *G06T 11/206* (2013.01); *G06T 2200/24* (2013.01)

(58) Field of Classification Search
CPC .. G06F 3/04883; G06F 3/0482; G06F 3/0485; G06F 3/0486
See application file for complete search history.

(56) References Cited

U.S. PATENT DOCUMENTS

| | | | | |
|---|---|---|---|---|
| 6,629,929 B1 * | 10/2003 | Jago | ..................... | G01S 7/52046 600/443 |
| 6,683,600 B1 * | 1/2004 | Lui | ..................... | G06F 3/04883 345/179 |
| 7,221,474 B2 * | 5/2007 | Hao | ..................... | G06T 11/206 358/1.18 |
| 7,266,476 B2 * | 9/2007 | Coburn | .................. | G05B 17/02 700/83 |
| 7,467,354 B2 * | 12/2008 | Barry | .................. | G06F 16/3323 715/764 |
| 7,844,174 B2 * | 11/2010 | Pickens | .............. | H04N 5/23212 396/121 |
| 8,125,457 B2 * | 2/2012 | Lawson | .................. | G06F 3/048 345/173 |
| 8,239,784 B2 * | 8/2012 | Hotelling | .............. | G06F 3/0418 715/830 |

(Continued)

*Primary Examiner* — Jung-Mu T Chuang
(74) *Attorney, Agent, or Firm* — Fountainhead Law Group P.C.

(57) ABSTRACT

Some embodiments provide a non-transitory machine-readable medium that stores a program. The program presents a selectable user interface (UI) item for toggling between operating in a first mode and operating in a second mode. The program further presents a chart visualization that includes a plurality of selectable data points. Upon receiving a touch input while operating in the first mode, the program also performs a first operation on the chart visualization. Upon receiving the touch input while operating in the second mode, the program further performs a second, different operation on the chart visualization.

20 Claims, 20 Drawing Sheets

(56) References Cited

U.S. PATENT DOCUMENTS

| Patent/Pub No. | Date | Inventor | Classification |
|---|---|---|---|
| 8,527,909 B1* | 9/2013 | Mullany | G06F 3/0484 345/173 |
| 8,736,432 B2* | 5/2014 | Sitarski | B60K 35/00 340/407.2 |
| 8,954,195 B2* | 2/2015 | Summer | B25J 13/02 700/245 |
| 8,983,550 B2* | 3/2015 | Narayanachar | H04M 1/27457 455/566 |
| 8,996,978 B2* | 3/2015 | Richstein | G06F 3/0488 715/215 |
| 9,146,638 B2* | 9/2015 | Prushinskiy | G06F 3/0416 |
| 9,182,837 B2* | 11/2015 | Day | G06F 3/038 |
| 9,183,561 B2* | 11/2015 | Hanumara | G06Q 30/02 |
| 9,424,367 B2* | 8/2016 | Baarz | G06F 17/30994 |
| 9,477,649 B1* | 10/2016 | Davidson | G06F 17/242 |
| 9,817,563 B1* | 11/2017 | Stokes | G06T 11/206 |
| 10,001,897 B2* | 6/2018 | Hou | G06F 3/0481 |
| 2003/0131315 A1* | 7/2003 | Escher | G06N 3/126 715/255 |
| 2004/0119744 A1* | 6/2004 | Chan | G06F 3/04812 715/763 |
| 2004/0196316 A1* | 10/2004 | Handy Bosma | G06F 3/04847 715/821 |
| 2005/0090747 A1* | 4/2005 | Clark | A61B 8/06 600/453 |
| 2007/0024646 A1* | 2/2007 | Saarinen | G06F 3/04883 345/660 |
| 2007/0119698 A1* | 5/2007 | Day | H03K 17/955 200/510 |
| 2007/0273667 A1* | 11/2007 | Shin | G06F 3/04883 345/173 |
| 2007/0283259 A1* | 12/2007 | Barry | G06F 16/3323 715/700 |
| 2008/0103950 A1* | 5/2008 | Mather | G06Q 40/00 705/35 |
| 2009/0024955 A1* | 1/2009 | Barry | G06F 16/3323 715/781 |
| 2009/0024959 A1* | 1/2009 | Barry | G06F 16/3323 715/810 |
| 2009/0121903 A1* | 5/2009 | Misage | G06F 3/03547 341/20 |
| 2009/0183104 A1* | 7/2009 | Dotson | G06F 16/904 715/771 |
| 2010/0231595 A1* | 9/2010 | Dang | G06F 17/30554 345/440 |
| 2010/0241994 A1* | 9/2010 | Wiley | G06F 3/04842 715/832 |
| 2011/0041087 A1* | 2/2011 | Leveille | G06T 11/206 715/765 |
| 2011/0115814 A1* | 5/2011 | Heimendinger | G06F 3/04883 345/619 |
| 2012/0089914 A1* | 4/2012 | Holt | G06F 3/0485 715/728 |
| 2012/0096349 A1* | 4/2012 | Zheng | G06F 3/042 715/702 |
| 2012/0330869 A1* | 12/2012 | Durham | G06N 5/022 706/16 |
| 2013/0042207 A1* | 2/2013 | Matthews | G06F 3/0482 715/840 |
| 2013/0187855 A1* | 7/2013 | Radakovitz | G06F 3/0488 345/163 |
| 2013/0205235 A1* | 8/2013 | Gabara | G06F 16/9535 715/763 |
| 2013/0222294 A1* | 8/2013 | Choi | G06F 3/041 345/173 |
| 2013/0275904 A1* | 10/2013 | Bhaskaran | G06F 3/048 715/771 |
| 2013/0330704 A1* | 12/2013 | Creamer | G09B 7/00 434/362 |
| 2013/0335337 A1* | 12/2013 | Chua | G06F 3/0488 345/173 |
| 2014/0059485 A1* | 2/2014 | Lehrian | G06F 3/0486 715/802 |
| 2014/0106823 A1* | 4/2014 | Narayanachar | H04M 1/27457 455/566 |
| 2014/0129985 A1* | 5/2014 | Morozov | G06F 3/0482 715/823 |
| 2014/0267287 A1* | 9/2014 | Dodgen | G06T 11/206 345/440 |
| 2014/0282145 A1* | 9/2014 | Dewan | G06F 3/04842 715/765 |
| 2014/0336513 A1* | 11/2014 | Sang | G01S 7/52034 600/443 |
| 2014/0347286 A1* | 11/2014 | Prushinskiy | G06F 3/0416 345/173 |
| 2015/0046856 A1* | 2/2015 | Rucker | G06F 3/04883 715/765 |
| 2015/0339320 A1* | 11/2015 | Herron | G06F 16/29 707/722 |
| 2016/0085309 A1* | 3/2016 | Ho | G06F 3/017 345/666 |
| 2016/0098177 A1* | 4/2016 | Kraut | G06F 3/0488 715/845 |
| 2016/0188598 A1* | 6/2016 | Moser | G06F 17/30554 707/723 |
| 2016/0357353 A1* | 12/2016 | Miura | G06F 3/0481 |
| 2017/0004638 A1* | 1/2017 | Csenteri | G06T 11/206 |
| 2017/0017386 A1* | 1/2017 | Mattson | G06F 17/30899 |
| 2017/0069118 A1* | 3/2017 | Stewart | G06F 3/04845 |
| 2017/0083213 A1* | 3/2017 | Missig | G06F 3/0416 |
| 2017/0102693 A1* | 4/2017 | Kidd | G05B 19/41875 |
| 2017/0252472 A1* | 9/2017 | Dang | A61L 2/04 |
| 2017/0252474 A1* | 9/2017 | Thompson | A61L 2/20 |
| 2018/0349516 A1* | 12/2018 | Dutta | G06F 16/904 |
| 2019/0089193 A1* | 3/2019 | Ranjan | G05B 15/02 |
| 2019/0349739 A1* | 11/2019 | Graham | G01S 19/51 |

* cited by examiner

HYBRID GESTURES FOR VISUALIZATIONS

BACKGROUND

Software applications may be deployed in a number of different ways. For example, some applications are deployed as web-based application. Typically, web-based applications are hosted on one or more computing devices and are accessible via networks (e.g., the Internet). Some such applications provide visualizations that may be interacted with by a user. In some instances, a user may interact with a visualization of the web-based application using a computing device and pointing device (e.g., a computer mouse, a trackball, a touchpad, etc.). A user may use a pointing device to provide different inputs to perform different operations on the visualization. Using a simple bar chart visualization as an example, a user may use a pointing device to hover the pointer over a bar in order to provide additional information associated with the data represented by the bar. A user may also use a pointing device to select (e.g., left-click, right-click, double-click, etc.) a bar in order to inspect the data represented by the bar. Many different functions are possible through different inputs.

SUMMARY

In some embodiments, a non-transitory machine-readable medium stores a program. The program presents a selectable user interface (UI) item for toggling between operating in a first mode and operating in a second mode. The program further presents a chart visualization that includes a plurality of selectable data points. Upon receiving a touch input while operating in the first mode, the program also performs a first operation on the chart visualization. Upon receiving the touch input while operating in the second mode, the program further performs a second, different operation on the chart visualization.

In some embodiments, the touch input may include a plurality of consecutive tap gestures on a subset of data points in the plurality of data points. The first operation may include a plurality of consecutive selections of a corresponding data point in the plurality of data points. The second operation may include a selection of the subset of data points in the plurality of data points. The touch input may include touching a first location for a defined amount of time and then dragging from the first location to a second location. The first operation may include a selection of a data point in the plurality of data points nearest the second location. The second operation may include a selection of the subset of data points in the plurality of data points that intersect an area defined by the first location and the second location. The touch input may be a first touch input. The program may further receive a second touch input comprising a drag gesture. In response to the second touch input, the program may also perform a scroll operation on the chart visualization.

In some embodiments, the touch input may be a first touch input. The program may further receive a second touch input comprising a first selection of a first data point in the plurality of data points. The program may also receive a third touch input comprising a second selection of a second data point in the plurality of data points. In response to the second and third touch inputs, the program may further present a comparison between the first data point and the second data point. The second touch input may include a tap gesture on the first data point. The third touch input may include touching a first location for a defined amount of time and dragging from the first location to a second location. The second data point may be the nearest data point in the plurality of data points to the second location.

In some embodiments, a method presents a selectable user interface (UI) item for toggling between operating in a first mode and operating in a second mode. The method further presents a chart visualization that includes a plurality of selectable data points. Upon receiving a touch input while operating in the first mode, the method also performs a first operation on the chart visualization. Upon receiving the touch input while operating in the second mode, the method further performs a second, different operation on the chart visualization.

In some embodiments, the touch input may include a plurality of consecutive tap gestures on a subset of data points in the plurality of data points. The first operation may include a plurality of consecutive selections of a corresponding data point in the plurality of data points. The second operation may include a selection of the subset of data points in the plurality of data points. The touch input may include touching a first location for a defined amount of time and then dragging from the first location to a second location. The first operation may include a selection of a data point in the plurality of data points nearest the second location. The second operation may include a selection of the subset of data points in the plurality of data points that intersect an area defined by the first location and the second location. The touch input may be a first touch input. The method may further receive a second touch input comprising a drag gesture. In response to the second touch input, the method may also perform a scroll operation on the chart visualization.

In some embodiments, the touch input may be a first touch input. The method may further receive a second touch input comprising a first selection of a first data point in the plurality of data points. The method may also receive a third touch input comprising a second selection of a second data point in the plurality of data points. In response to the second and third touch inputs, the method may further present a comparison between the first data point and the second data point. The second touch input may include a tap gesture on the first data point. The third touch input may include touching a first location for a defined amount of time and dragging from the first location to a second location. The second data point may be the nearest data point in the plurality of data points to the second location.

In some embodiments, a system includes a set of processing units and a non-transitory computer-readable medium that stores instructions. The instructions cause at least one processing unit to present a selectable user interface (UI) item for toggling between operating in a first mode and operating in a second mode. The instructions further cause the at least one processing unit to present a chart visualization that includes a plurality of selectable data points. Upon receiving a touch input while operating in the first mode, the instructions also cause the at least one processing unit to perform a first operation on the chart visualization. Upon receiving the touch input while operating in the second mode, the instructions further cause the at least one processing unit to perform a second, different operation on the chart visualization.

In some embodiments, the touch input may include a plurality of consecutive tap gestures on a subset of data points in the plurality of data points. The first operation may include a plurality of consecutive selections of a corresponding data point in the plurality of data points. The second operation may include a selection of the subset of data points in the plurality of data points. The touch input may include touching a first location for a defined amount of time and then dragging from the first location to a second location. The first operation may include a selection of a data point in the plurality of data points nearest the second location. The second operation may include a selection of the subset of data points in the plurality of data points that intersect an area defined by the first location and the second location. The touch input may be a first touch input. The instructions may further cause the at least one processing unit to receive a second touch input comprising a drag gesture. In response to the second touch input, the instructions may also cause the at least one processing unit to perform a scroll operation on the chart visualization.

In some embodiments, the touch input may be a first touch input. The instructions may further cause the at least one processing unit to receive a second touch input comprising a first selection of a first data point in the plurality of data points. The instructions may also cause the at least one processing unit to receive a third touch input comprising a second selection of a second data point in the plurality of data points. In response to the second and third touch inputs, the instructions may further cause the at least one processing unit to present a comparison between the first data point and the second data point. The second touch input may include a tap gesture on the first data point. The third touch input may include touching a first location for a defined amount of time and dragging from the first location to a second location. The second data point may be the nearest data point in the plurality of data points to the second location.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for performing different operations on visualizations in response to different inputs. In some embodiments, a device includes an application that is configured to present different visualizations on a touch-based display of the device. The inputs for performing operations on visualizations may be touch-based gesture inputs provided through the touch-based display of the device. Examples of the different operations that may be performed on a visualization include scrolling through a visualization, selecting single data elements of the visualization, selecting multiple data elements of the visualization, scrubbing through data elements of the visualization, and comparing data elements of the visualization.

In some embodiments, the application may have several different operating modes. When the device receives an input while the application is providing a visualization and operating in a first mode, the input may be translated to a first set of operations to be performed on the visualization. When the device receives the same input while the application is providing the visualization and operating in a second mode, the input may be translated to a second set of operations to be performed on the visualization. By having different operating modes, the different operations may be performed on the visualization based on the same input.

In some embodiments, a data model is defined as one or more views and one or more tables associated with the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables. In some embodiments, a data model definition specifies a one or more tables that includes a set of measures and a set of dimensions. In some such embodiments, a measure may be an attribute in the one or more tables that is configured to store a numeric value while a dimension may be an attribute in the one or more tables that is configured to store a value associated with a measure that is used for categorizing the measure.

Figure 1:
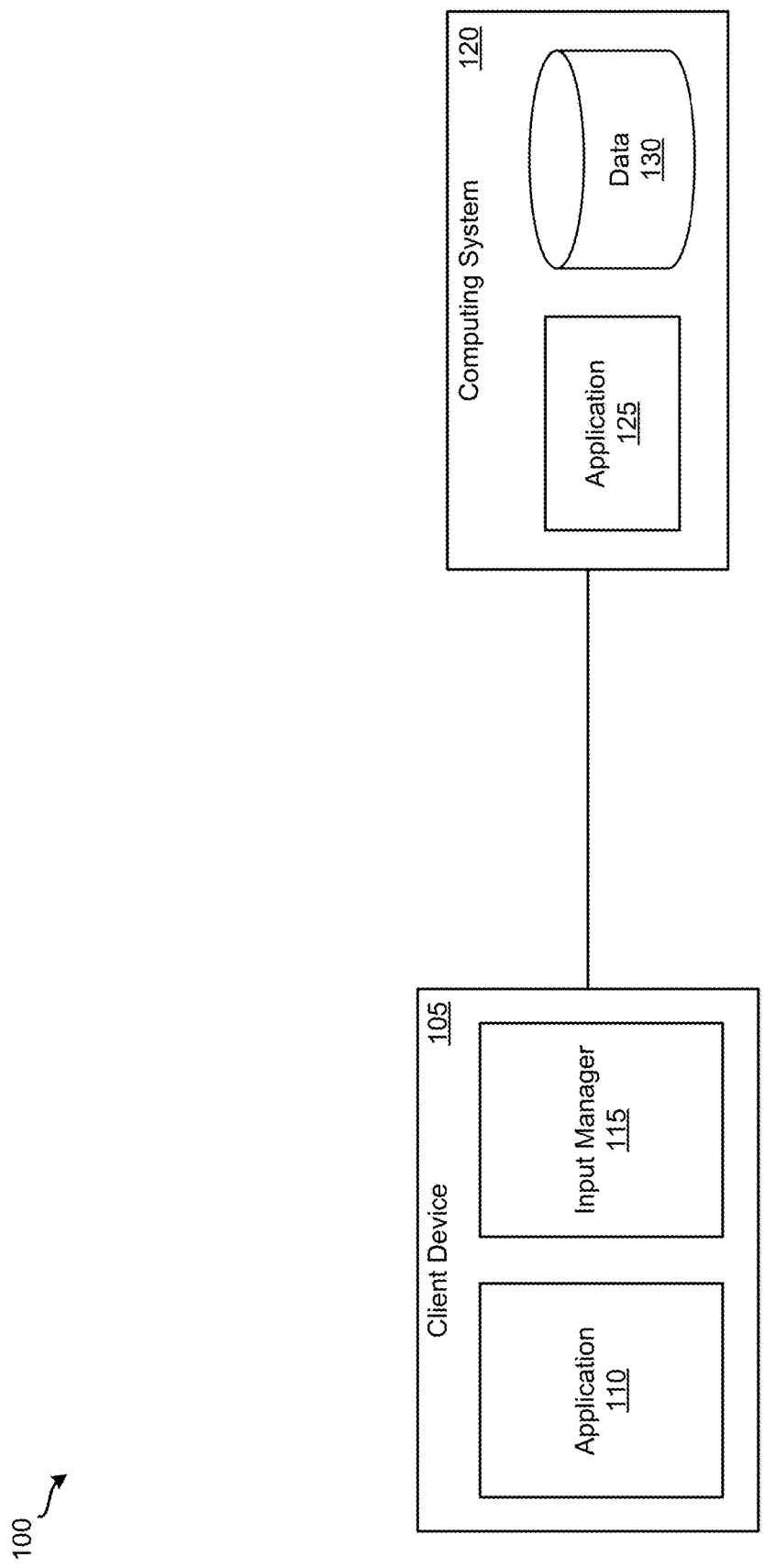
FIG. 1 illustrates a system according to some embodiments.

FIG. 1 illustrates system 100 according to some embodiments. As shown, system 100 includes client device 105 and computing system 120. Client device 105 includes application 110 and input manager 115. Application 110 may be a software application operating on client device 105. Application 110 may be any number of different types of applications. For instance, application 110 may be an analytics application, a data management application, a human capital management application, an enterprise management application, a customer relationship management application, a financial management application, etc. Application 110 may receive requests from a user of client device 105. For instance, application 110 can receive from a user of client device 105 a request for a visualization of data stored according to a data model. In some embodiments, the visualization of data may be a chart visualization such as, for example, a bar chart, a pie chart, a line chart, a scatter chart, etc. In response to the request, application 110 may forward the request to computing system 120. After computing system 120 processes the request, application 110 can receive the requested visualization from computing system

120. Then, application 110 may present (e.g., by displaying on a display of client device 105) the visualization to the user of client device 105.

Application 110 is also responsible for managing visualizations. For example, while application 110 is presenting a visualization, application 110 may receive input by a user of client device 105. Next, application 110 sends the input to input manager 115 for processing. Once input manager 115 processes the input, application 110 receives a set of operations from input manager 115. Then, application 110 performs the set of operations on the visualization.

Input manager 115 is configured to translate input received by client device 105 to corresponding operations. In some embodiments, client device 105 may include a touch-based display (not shown) through which touch-based input may be received. Input manager 115 may receive gesture inputs from client device 105 that client device 105 receives from a user via the touch-based display in some such embodiments. For such a gesture input, input manager 115 can determine a corresponding operation to perform based on the type of gesture input.

As illustrated in FIG. 1, computing system 120 includes application 125 and data storage 130. Application 125 may be a software application operating on (e.g., hosted on) computing system 120 that may be accessed by client device 105. Application 125 may be any number of different types of applications. For instance, application 125 may be an analytics application, a data management application, a human capital management application, an enterprise management application, a customer relationship management application, a financial management application, etc.

Application 125 may receive requests from client device 105. For instance, application 125 can receive from client device 105 a request for a visualization of data stored according to a data model. In response to such a request, application 125 accesses data storage 130 to retrieve the requested data. Then, application 125 generates the visualization using the requested data and sends the visualization to client device 105.

Data storage 130 is configured to store data used for visualizations. In some embodiments, storage 130 is implemented in a single physical storage while, in other embodiments, storage 130 may be implemented across several physical storages. While FIG. 1 shows storage 130 as part of computing system 120, one of ordinary skill in the art will appreciate that storage 130 may be external to computing system 120 in some embodiments.

Figure 2A:
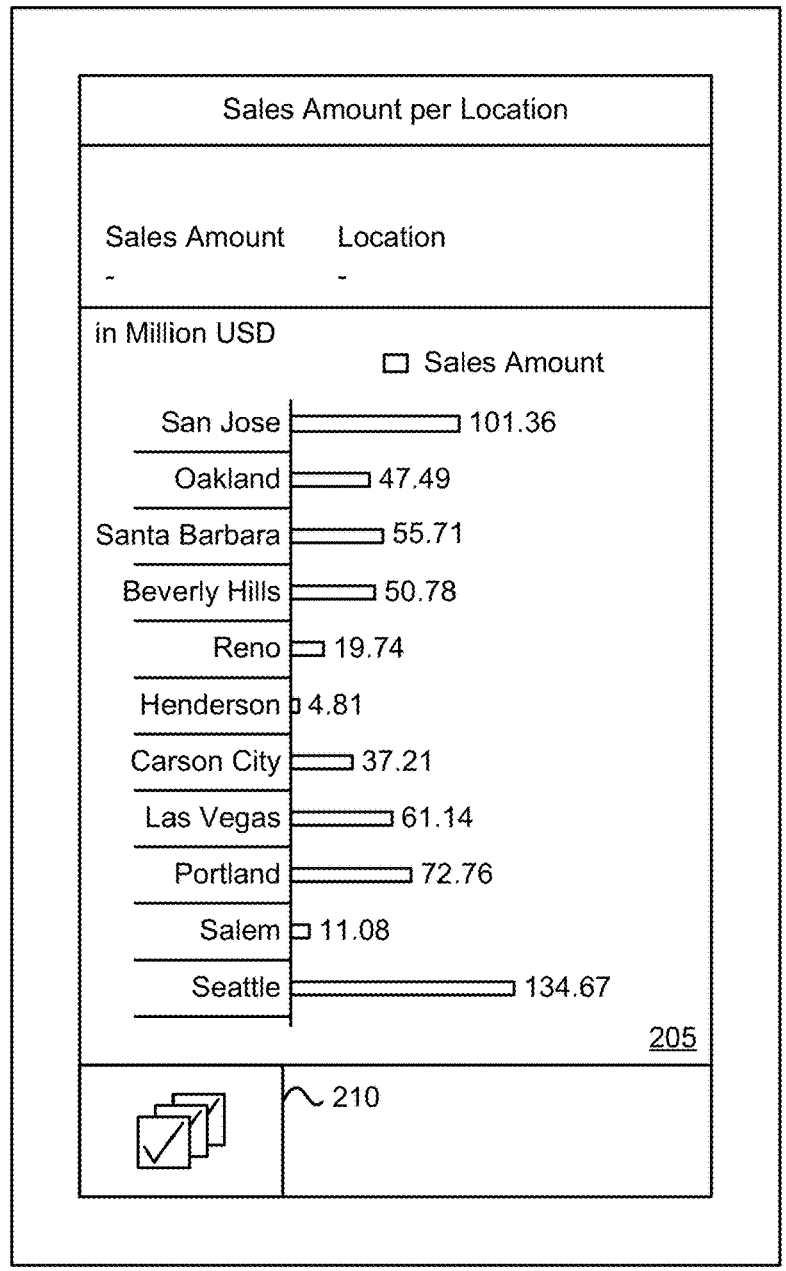
FIGS. 2A-2C illustrate an example scroll operation according to some embodiments.
Figure 2B:
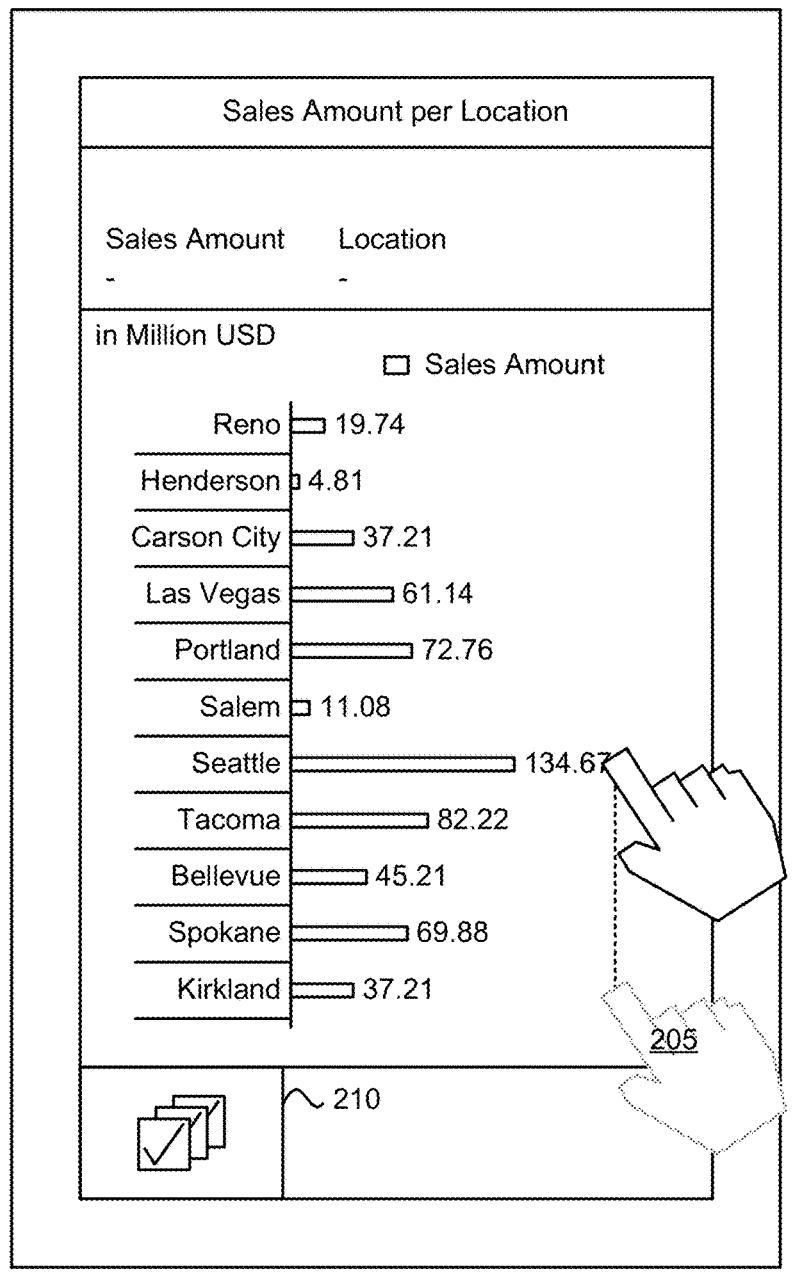
Figure 2C:
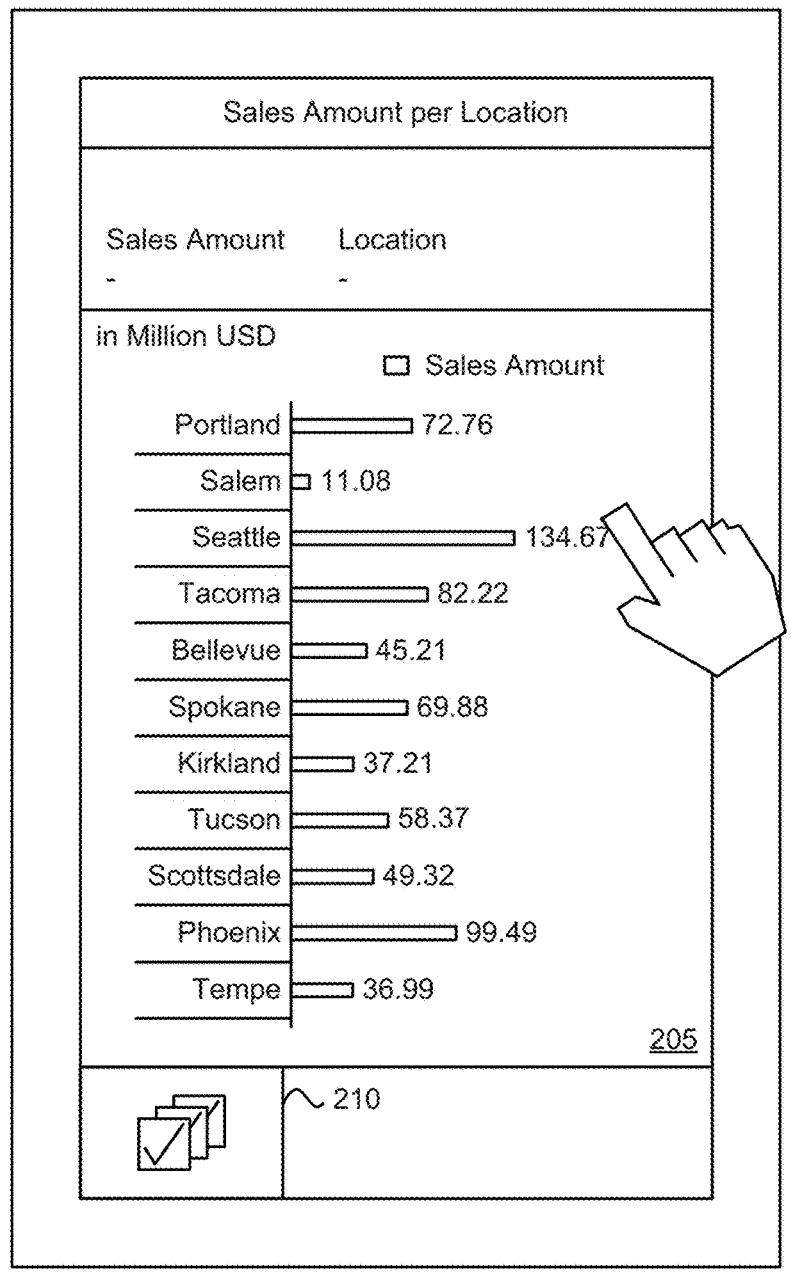

Several example operations of system 100 will be described below by reference to FIGS. 2-7. A first example operation of system 100 will now be described by reference to FIGS. 2A-2C. FIGS. 2A-2C illustrate an example scroll operation according to some embodiments. In particular, FIGS. 2A-2C illustrate graphical user interface (GUI) 200, which is provided by application 110, at three different stages 250-260 of a scroll operation. As illustrated, GUI 200 includes chart visualization 205 and selectable user interface (UI) item 210. UI item 210 is configured to, upon selection, toggle between a first operating mode of application 110 and a second operating mode of application 110. For the examples described below, when UI item 210 is not highlighted, it indicates that application 110 is operating in the first mode and when UI item is highlighted, it indicates that application 110 is operating in the second mode. Also for the examples described below, the top portion of chart visualization 205 displays a sales amount measure of a data model and a location dimension of the data model and chart visualization 205 is a bar chart depicting sales amounts for various different locations that a user of application 110 has requested to view. In response to the request, application 110 forwards the request to application 125. When application 125 receives the request, application 125 accesses data storage 130 to retrieve the requested data, generates chart visualization 205 using the requested data, and sends chart visualization 205 to application 110. Upon receiving chart visualization 205, application 110 presents (e.g., by displaying on a display of client device 105) it for viewing.

Referring to FIG. 2A, the first stage 250 of the scroll operation illustrates application 110 presenting chart visualization 205 in GUI 200. As shown, chart visualization 205 is depicting sales amounts for the several different locations. Specifically, chart visualization 205 shows a sales amount of $101.35M for San Jose, a sales amount of $47.49M for Oakland, a sales amount of $55.71M for Santa Barbara, a sales amount of $50.78M for Beverly Hills, a sales amount of $19.74M for Reno, a sales amount of $4.81M for Henderson, a sales amount of $37.21M for Carson City, a sales amount of $61.14M for Las Vegas, a sales amount of $72.76M for Portland, a sales amount of $11.08M for Salem, and a sales amount of $134.67M for Seattle.

Referring to FIG. 2B, the second stage 255 illustrates GUI 200 after a user of application 110 starts providing a touch-based gesture input through a touch-based display of client device 105. For this example, the user of application 110 started the gesture input by touching the touch-based display near the bar representing the Seattle data element in chart visualization 205 and dragging upwards on the touch-based display. When application 110 is receiving the gesture input, application 110 is forwarding the gesture input to input manager 115. Next, input manager 115 translates the gesture input as a scroll up operation and notifies application 110 of the operation. In response, application 110 scrolls the bar chart in chart visualization 205 upwards as illustrated in the second stage 255. Also, the second stage 255 of GUI 200 shows UI item 210 as not highlighted and, thus, application 110 is operating in the first mode while receiving the gesture input.

Referring to FIG. 2C, the third stage 260 illustrates GUI 200 after the user of application 110 finished providing the touch-based gesture input described above by reference to the second stage 255. As shown, application 110 has scrolled the bar chart upwards in response to the gesture input. As a result, additional sales amounts for other locations are displayed in the bar chart of chart visualization 205. Additionally, the third stage 260 of GUI 200 shows UI item 210 as not highlighted so application 110 is operating in the first mode while receiving the gesture input.

Figure 3:
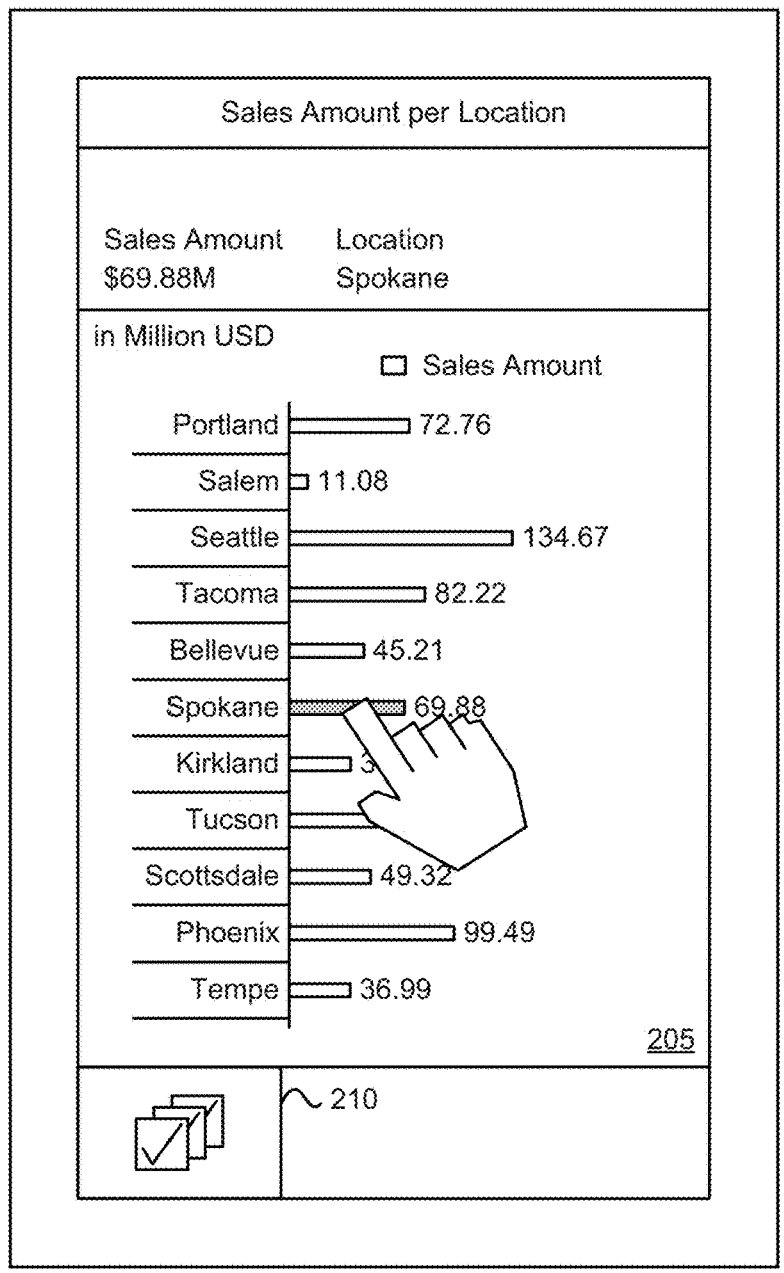
FIG. 3 illustrates an example select operation according to some embodiments.

A second example operation of system 100 will now be described by reference to FIG. 3. FIG. 3 illustrates an example select operation according to some embodiments. For this example, GUI 200 in FIG. 3 continues from the third stage 260 of FIG. 2C and shows GUI 200 after the user of application 110 selects a bar in the bar chart of chart visualization 205. As shown, the user of application 110 selected the bar representing the location for Spokane. Specifically, the user of application 110 selected the bar by providing a touch-based gesture input through the touch-based display of client device 105. For this example, the user tapped the touch-based display of client device 105 at or near the bar representing the location Spokane as illustrated in FIG. 3. When application 110 receives the gesture input, application 110 forwards the gesture input to input manager 115. Then, input manager 115 translates the gesture input as a select operation and notifies application 110 of the operation. In response, application 110 highlights the bar representing the location for Spokane in chart visualization 205 and displays the sales amount ($69.88M in this example) and the location in the top portion of chart visualization 205. GUI 200 of FIG. 3 shows UI item 210 as not highlighted and, thus, application 110 is operating in the first mode while receiving the gesture input.

Figure 4A:
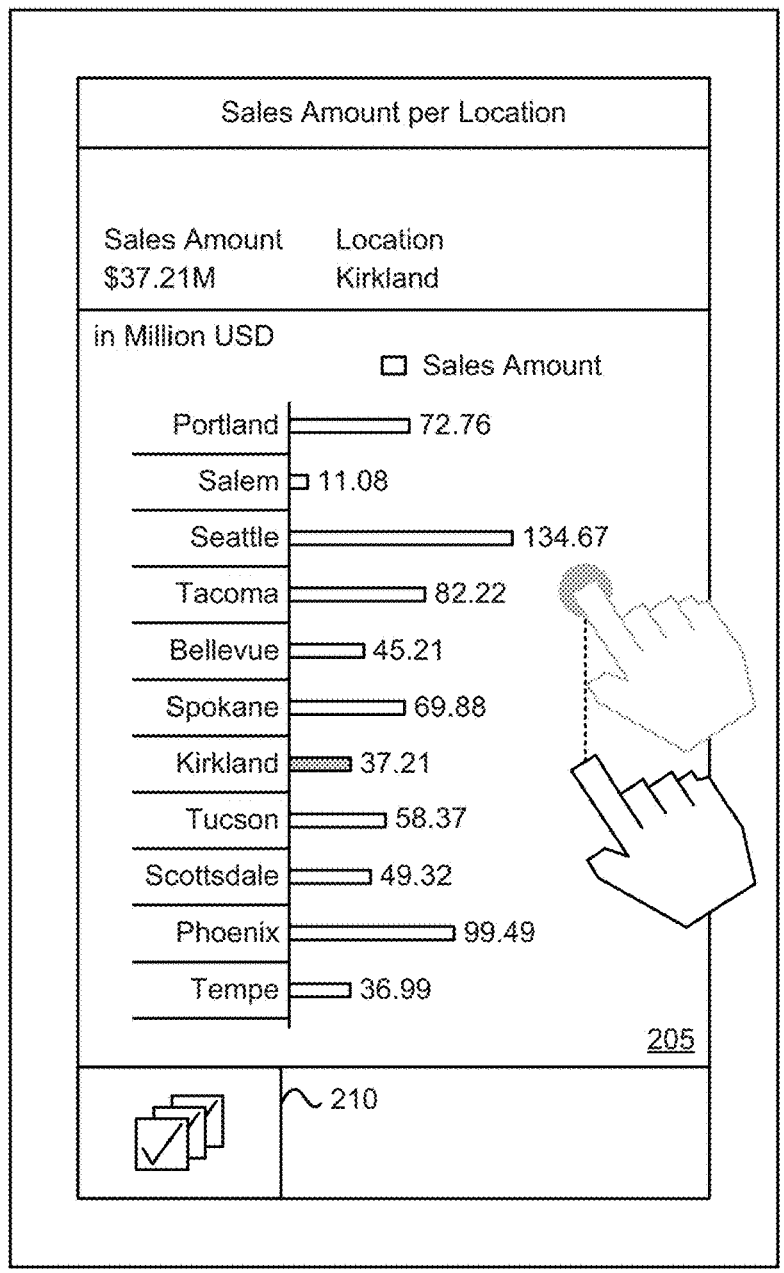
FIGS. 4A and 4B illustrate an example scrubbing operation according to some embodiments.
Figure 4B:
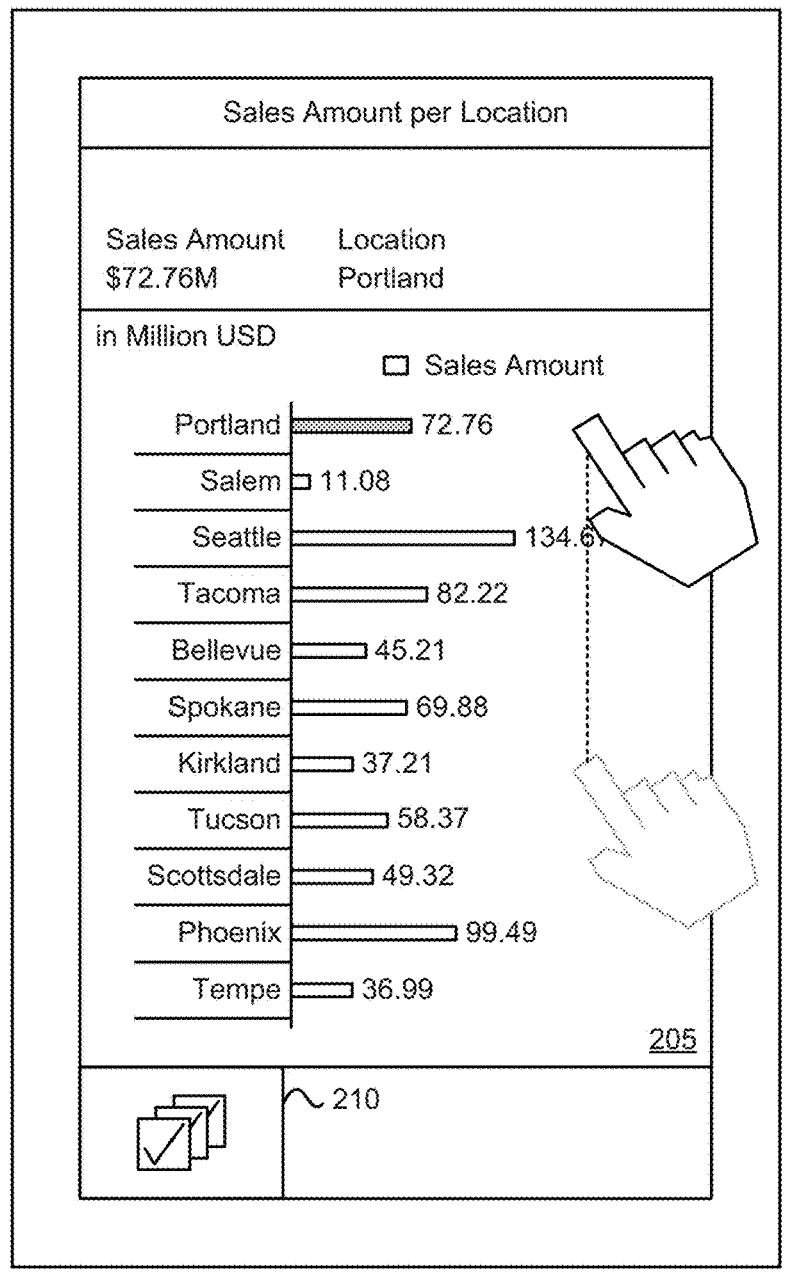

A third example operation of system 100 will now be described by reference to FIGS. 4A and 4B. FIGS. 4A and 4B illustrate an example scrubbing operation according to some embodiments. In particular, FIGS. 4A and 4B illustrate GUI 200 at two different stages 450 and 455 of a scrubbing operation. Referring to FIG. 4A, the first stage 450 of GUI 200 continues from the third stage 260 of FIG. 2C and shows GUI 200 after the user of application 110 starts providing a touch-based gesture input through the touch-based display of client device 105. The user of application 110 for this example started the gesture input by touching the touch-based display at a location in the bar chart of chart visualization 205, holding the touch at the location for a defined amount of time (e.g., 200 millisecond (ms), 500 ms, 1 second, etc.), and then dragging around the bar chart area of chart visualization 205. When application 110 is receiving the gesture input, application 110 is forwarding the gesture input to input manager 115. Upon receiving the gesture input, input manager 115 translates the gesture input as a scrubbing operation and notifies application 110 of the operation. In response, application 110 highlights the bar horizontally nearest the location being touched and displays the sales amount and the location associated with the bar in the top portion of chart visualization 205. As shown in the first stage 450, application 110 is highlighting the bar representing the location for Kirkland in chart visualization 205 since this bar is the horizontally nearest bar to the location in the bar chart being touched. In addition, application 110 is displaying the sales amount ($37.21M in this example) and the location in the top portion of chart visualization 205. The first stage 450 of GUI 200 shows UI item 210 as not highlighted so application 110 is operating in the first mode while receiving the gesture input.

Referring to FIG. 4B, the second stage 455 illustrates GUI 200 after the user of application 110 ended the touch-based gesture input illustrated in the first stage 450. In this example, the user of application 110 ended the gesture input by ceasing to touch (e.g., lifting a finger used to touch) the touch-based display of client device 105. When application 110 receives the end of the gesture input, application 110 continues to highlight the bar in the bar chart that application was highlighting at the end of the gesture. For this example, the user ended the gesture input at the location illustrated in the second stage 455. As such, the second stage 455 of GUI 200 shows application 100 highlighting the bar representing the location for Portland in chart visualization 205 as this bar is the horizontally nearest bar to the location at which the gesture input ended. As shown, application 110 is displaying the sales amount ($72.76M in this example) and the location in the top portion of chart visualization 205. Additionally, the second stage 455 of GUI 200 shows UI item 210 as not highlighted and, hence, application 110 was operating in the first mode while receiving the gesture input.

The operations described above by reference to FIGS. 3, 4A and 4B illustrate examples of select operations in which a single data element in selected. After a user of application 110 selects a data point (e.g., a bar in a bar chart) in a chart visualization, the application 110 may provide additional information associated with the selected data point. In some embodiments, the user may perform various operations on the chart visualization based on the selected data point. For example, application 110 may allow the user to traverse up and/or down a hierarchy used to structure the data of the chart visualization. As another example, the application 110 can allow the user to exclude the selected data point from the chart visualization, filter the data to only include the selected data point, zoom into the selected data point, etc.

Figure 5A:
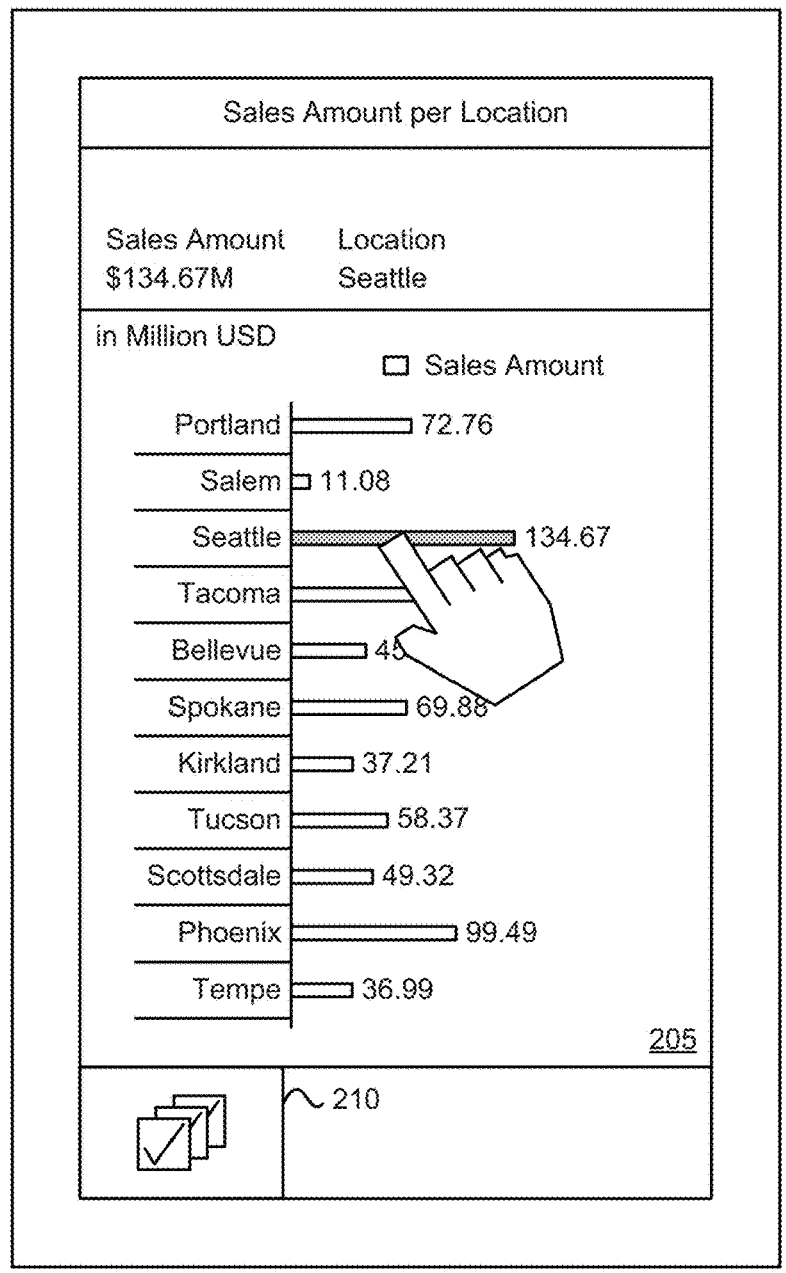
FIGS. 5A and 5B illustrate an example comparison operation according to some embodiments.
Figure 5B:
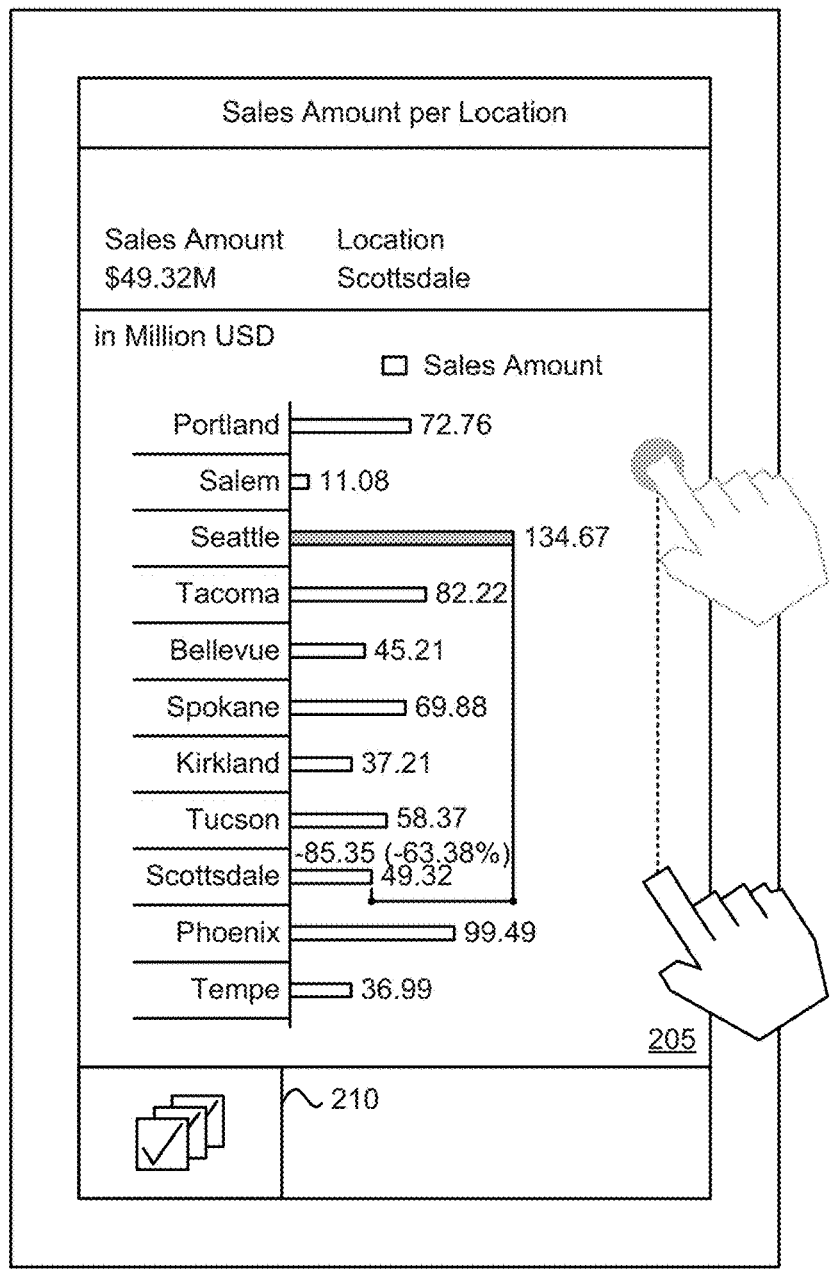

A fourth example operation of system 100 will now be described by reference to FIGS. 5A and 5B. FIGS. 5A and 5B illustrate an example comparison operation according to some embodiments. Specifically, FIGS. 5A and 5B illustrate GUI 200 at two different stages 550 and 555 of a comparison operation. Referring to FIG. 5A, the first stage 550 of GUI 200 continues from the third stage 260 of FIG. 2C and shows GUI 200 after the user of application 110 selected a bar in the bar chart of chart visualization 205. In this example, the user of application 110 selected the bar representing the location for Seattle in the same or similar manner as that described above by reference to FIG. 3. As such, the first stage 550 of GUI 200 shows application 110 highlighting the bar representing the location for Seattle in chart visualization 205 and displays the sales amount ($134.67M in this example) and the location in the top portion of chart visualization 205. Also, the first stage 550 of GUI 200 shows UI item 210 as not highlighted and, thus, application 110 was operating in the first mode while receiving the gesture input.

Referring to FIG. 5B, the second stage 555 illustrates GUI 200 after the user of application 110 starts providing a touch-based gesture input similar to the one described above by reference to the first stage 450 of FIG. 4A. That is, the user in this example started the gesture input by touching the touch-based display at a location in the bar chart of chart visualization 205 illustrated in the second stage 555, holding the touch at the location for a defined amount of time, and then dragging around the bar chart area of chart visualization 205. When application 110 is receiving the gesture input, application 110 is forwarding the gesture input to input manager 115. Upon receiving the gesture input, input manager 115 translates the gesture input as a comparison operation since the gesture input was preceded by a selection of a bar and notifies application 110 of the operation. In response, application 110 compares the data of the bar horizontally nearest the location being touched with the data of the selected bar and displays the difference between the two data along with sales amount and the location associated with the bar horizontally nearest the location being touched in the top portion of chart visualization 205. As shown in the second stage 555, application 110 is displaying the difference (−$85.35M and −63.38% in this example) between the data for Seattle and the data for Scottsdale, the location represented by the bar in the bar chart of chart visualization 205 horizontally nearest the location being touched. Application 110 is also displaying the sales amount ($49.32M in this example) and the location for Scottsdale in the top portion of chart visualization 205. The second stage 555 of GUI 200 shows UI item 210 as not highlighted so application 110 is operating in the first mode while receiving the gesture input.

The example operations of system 100 described above illustrate operations that application 110 performs while operation in the first mode. Several example operations that application 110 performs while operating in the second mode will be described below. A first example of such an operation of system 100 will now be described by reference to FIGS. 6A-6D. FIGS. 6A-6D illustrate an example multi-select operation according to some embodiments. In particular, FIGS. 6A-6D illustrate GUI 200 at four different stages 650-665 of a multi-select operation. Referring to FIG.

6A, the first stage 650 of GUI 200 continues from the third stage 260 of FIG. 2C and shows GUI 200 after the user of application 110 selected UI item 210. In this example, the user of application 110 selected UI item 210 in the same or similar manner as that described above by reference to FIG. 3. When application 110 receives the selection of UI item 210, application 110 forwards the gesture input to input manager 115. Input manager 115 then translates the gesture input as a select operation and notifies application 110 of the operation. In response, application 110 transitions from operating in the first mode to operating in the second mode. Application 110 also highlights UI item 210, as shown in the first stage 650, to indicate that application 110 is operating in the second mode.

Figure 6A:
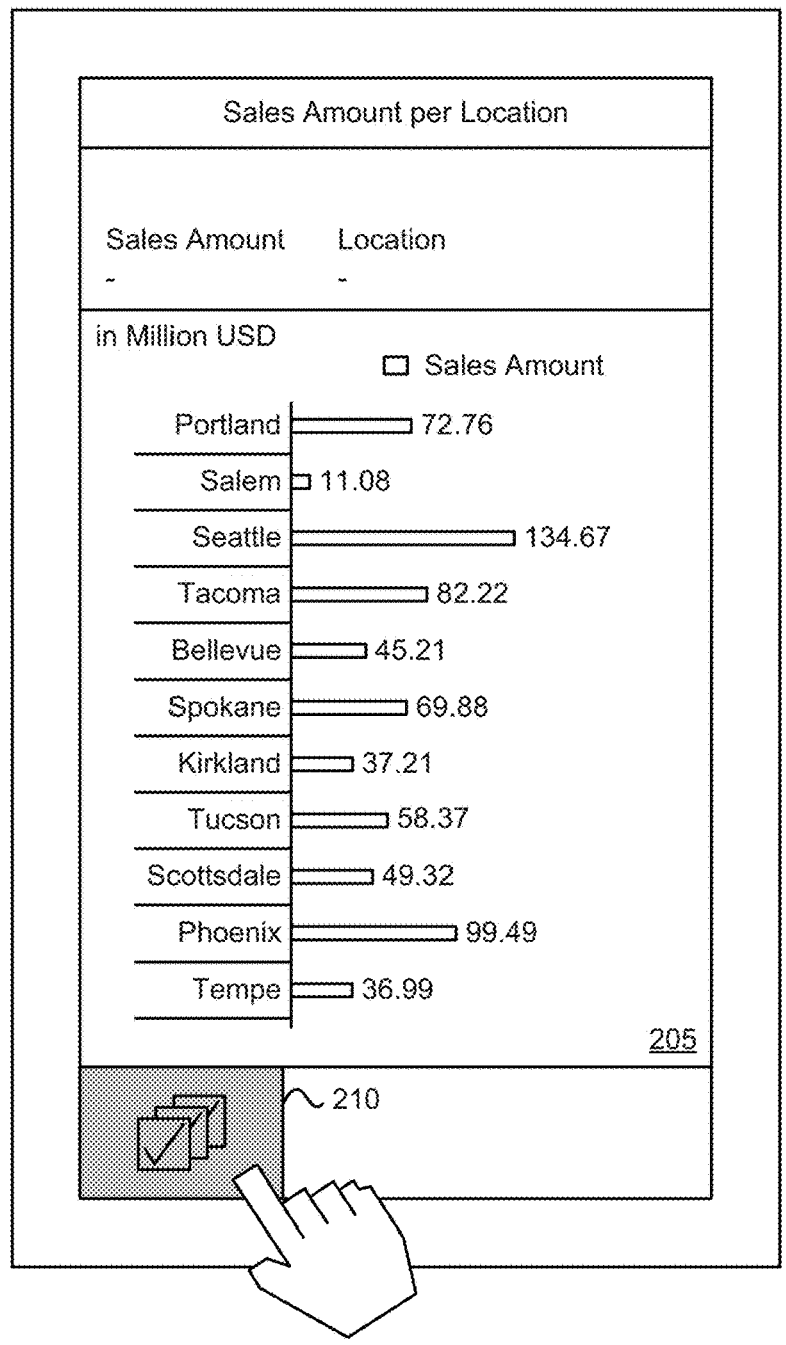
FIGS. 6A-6D illustrate an example multi-select operation according to some embodiments.
Figure 6B:
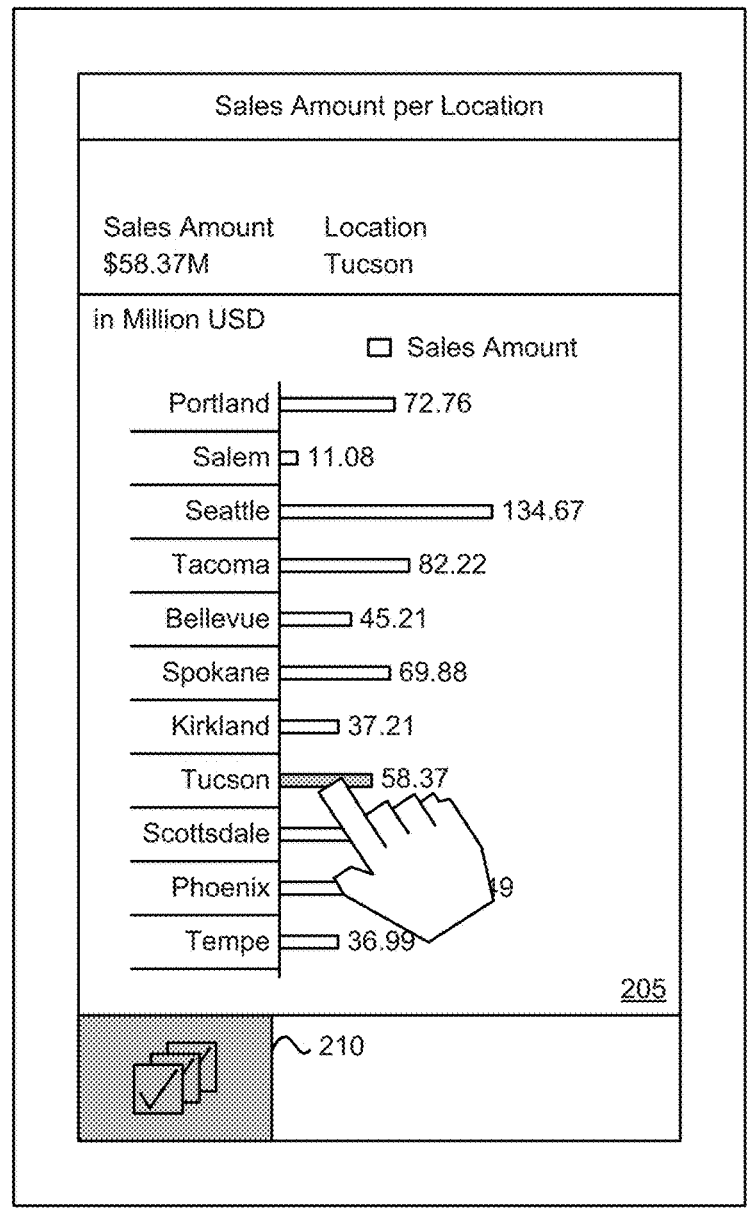

Referring to FIG. 6B, the second stage 655 illustrates GUI 200 after the user of application 110 selects a bar in the bar chart of chart visualization 205. As shown, the user of application 110 selected the bar representing the location for Tucson. For this example, the user of application 110 selected this bar in the same or similar manner as that described above by reference to FIG. 3. When application 110 receives the gesture input, application 110 forwards the gesture input to input manager 115. Then, input manager 115 translates the gesture input as a select operation and notifies application 110 of the operation. In response, application 110 highlights the bar representing the location for Tucson in chart visualization 205 and displays the sales amount ($58.37M in this example) and the location in the top portion of chart visualization 205. The second stage 655 of GUI 200 also shows UI item 210 as highlighted and, thus, application 110 was operating in the second mode while receiving the gesture input.

Figure 6C:
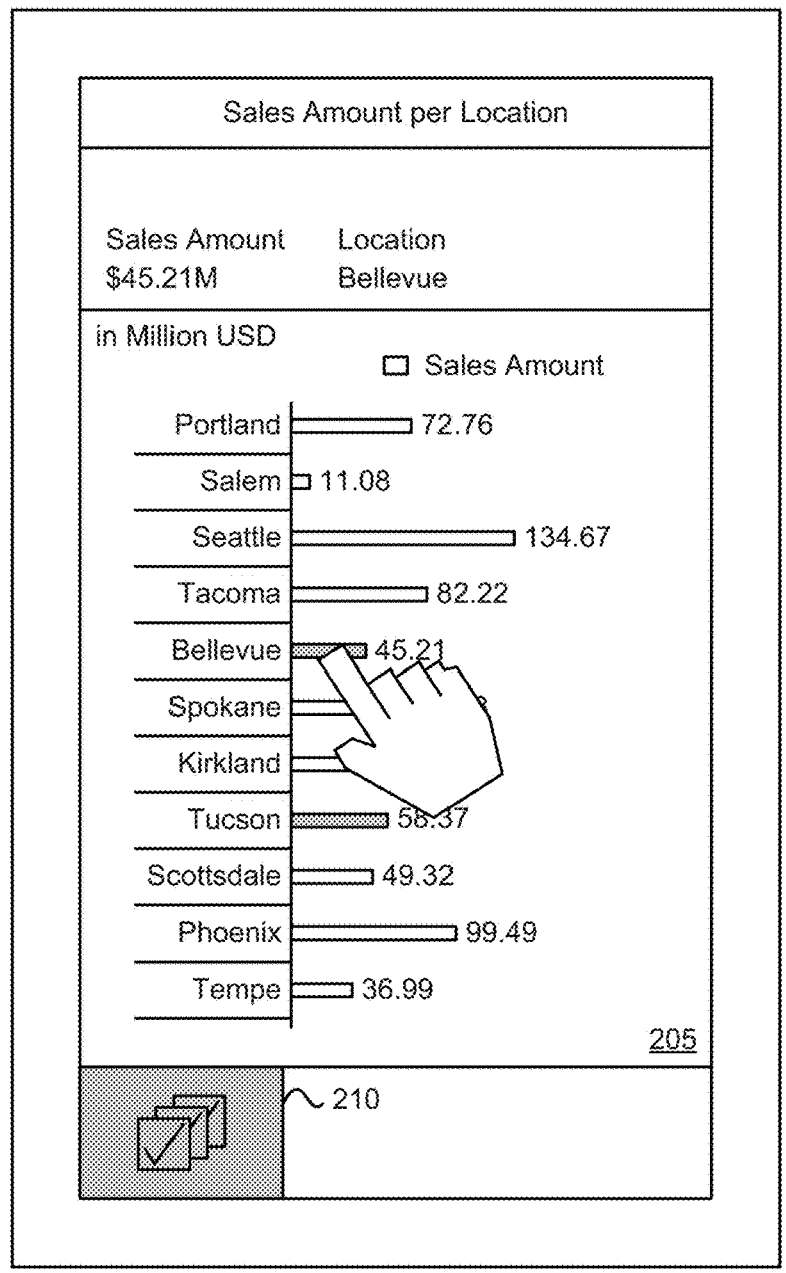

Referring to FIG. 6C, the third stage 660 illustrates GUI 200 after the user of application 110 selects a second bar in the bar chart of chart visualization 205. Specifically, the third stage 660 of GUI 200 illustrates that the user of application 110 selected the bar representing the location for Bellevue. In this example, the user of application 110 selected this bar in the same or similar manner as that described above by reference to FIG. 3. When application 110 receives the gesture input, application 110 forwards the gesture input to input manager 115. Then, input manager 115 translates the gesture input as a select operation and notifies application 110 of the operation. Since application 110 is operating in the second mode, as indicated by the highlighting of UI item 210, application 110 continues to highlight the bar representing the location for Tucson and also highlights the bar representing the location for Bellevue in chart visualization 205. Application 110 additionally displays the sales amount ($45.21M in this example) and the location for the most recently selected bar (Bellevue in this example) in the top portion of chart visualization 205.

Figure 6D:
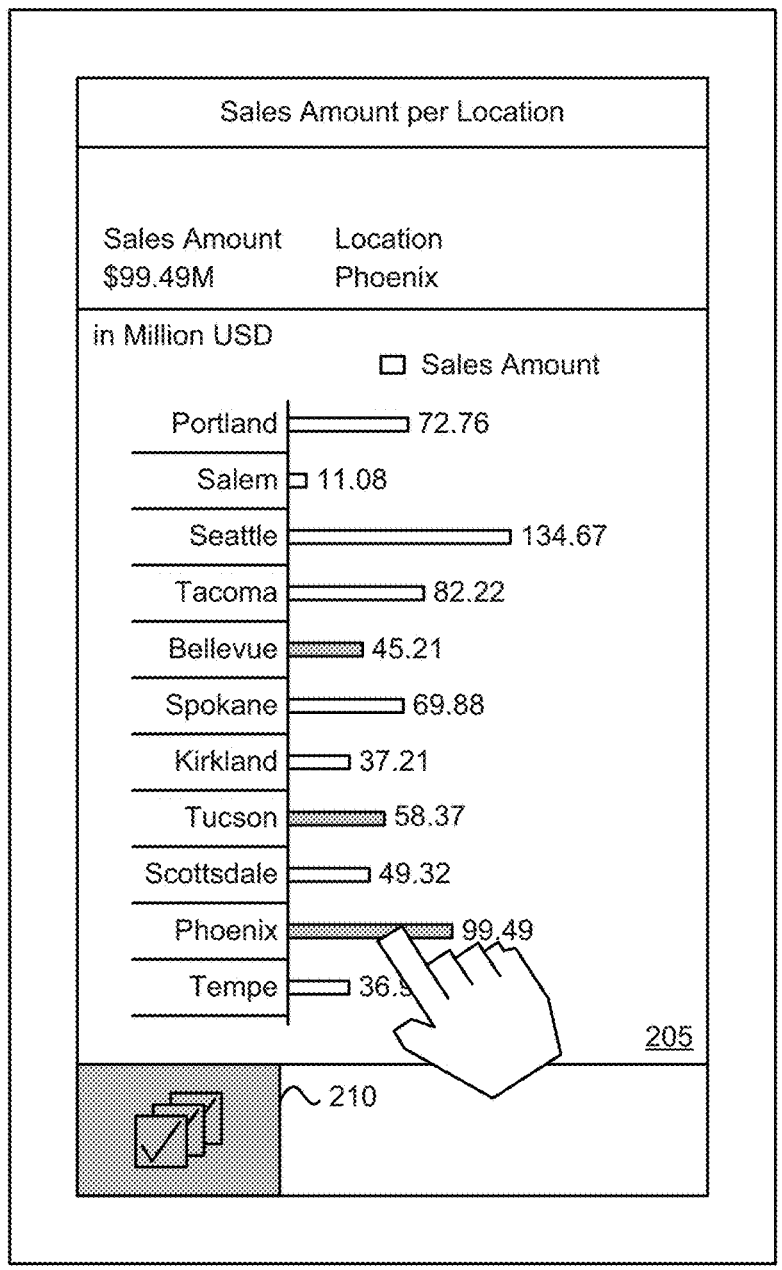

Referring to FIG. 6D, the fourth stage 665 illustrates GUI 200 after the user of application 110 selects a third bar in the bar chart of chart visualization 205. As shown, the user of application 110 in the third stage 660 of GUI 200 selected the bar representing the location for Phoenix. For this example, the user of application 110 selected this bar in the same or similar manner as that described above by reference to FIG. 3. When application 110 receives the gesture input, application 110 forwards the gesture input to input manager 115. Input manager 115 then translates the gesture input as a select operation and notifies application 110 of the operation. Since application 110 is operating in the second mode, as indicated by the highlighting of UI item 210, application 110 continues to highlight the bars representing the locations for Tucson and Bellevue and also highlights the bar representing the location for Phoenix in chart visualization 205. Application 110 also displays the sales amount ($99.49M in this example) and the location for the most recently selected bar (Phoenix in this example) in the top portion of chart visualization 205.

Figure 7A:
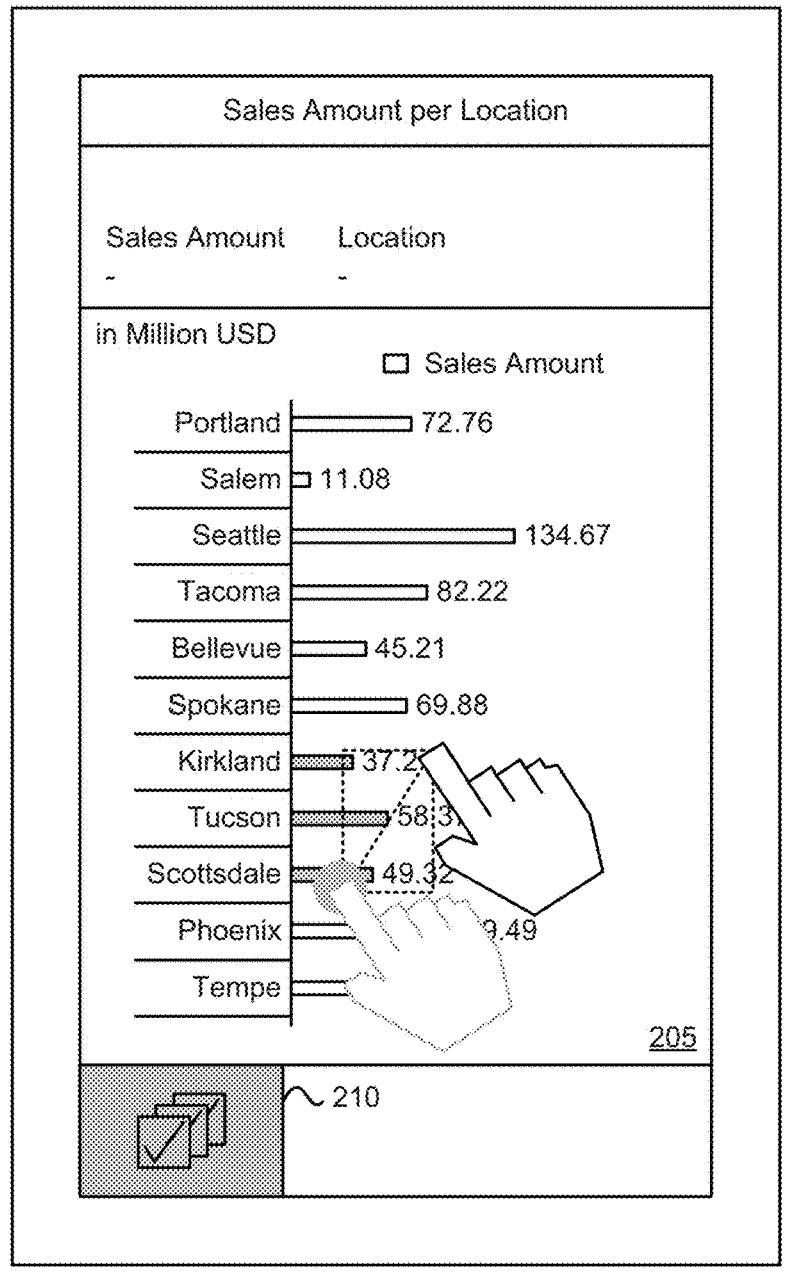
FIGS. 7A-7C illustrate another example multi-select operation according to some embodiments.
Figure 7B:
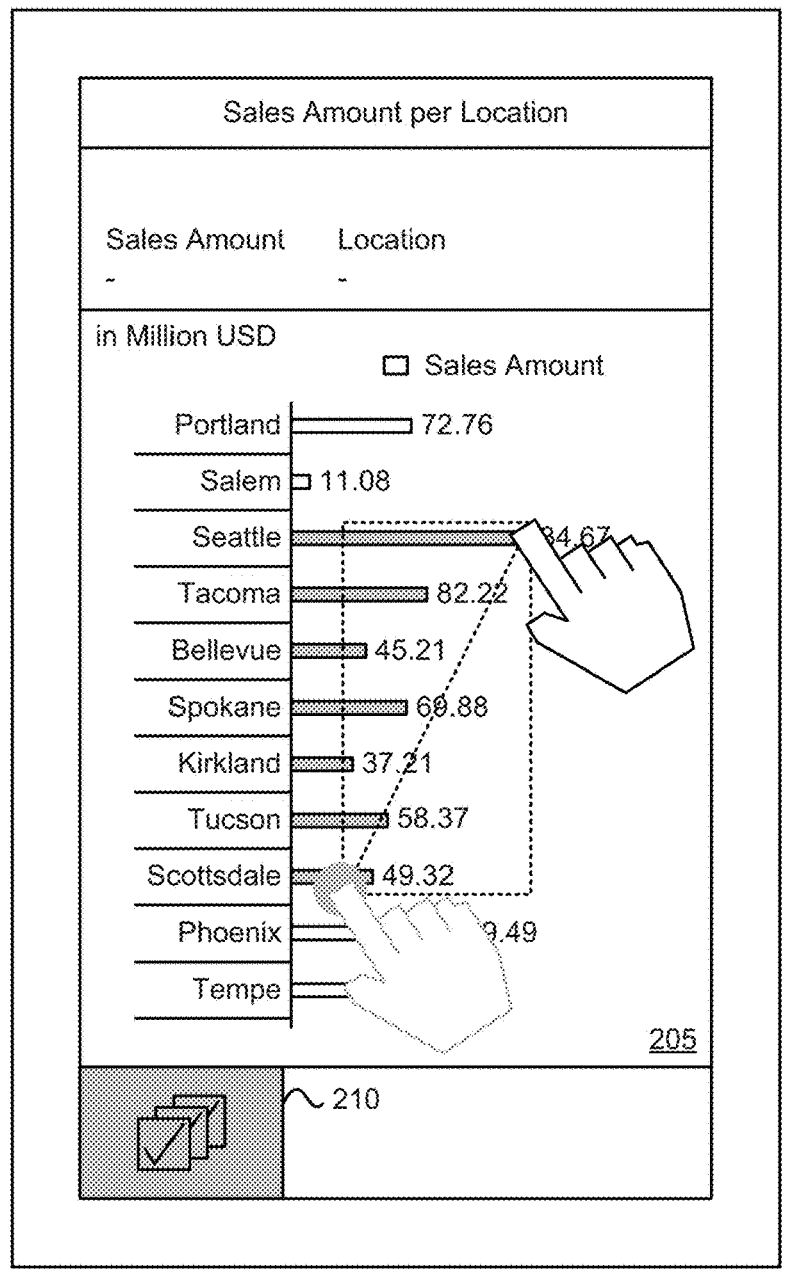
Figure 7C:
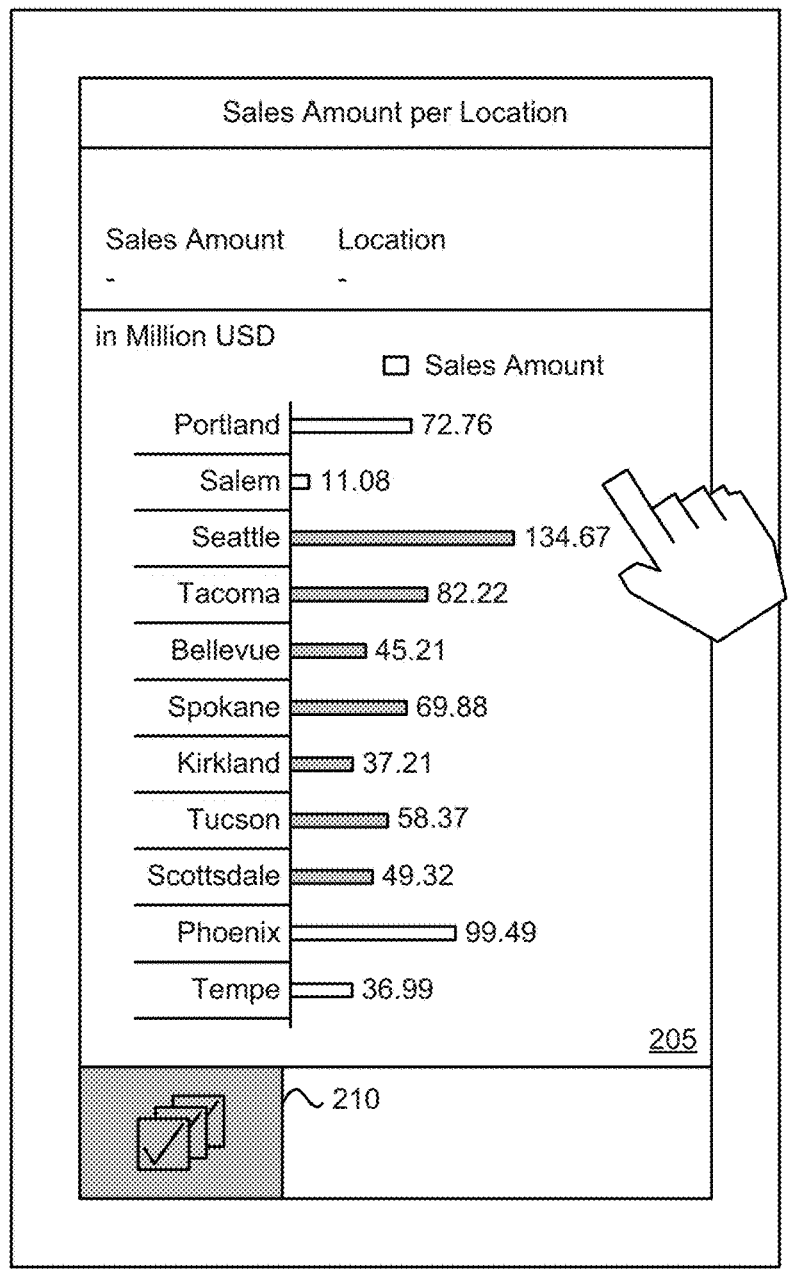

A second example of an operation of system 100 in which application is operating in the second mode will now be described by reference to FIGS. 7A-7C. FIGS. 7A-7C illustrate another example multi-select operation according to some embodiments. Specifically, FIGS. 7A-7C illustrate GUI 200 at three different stages 750-760 of a multi-select operation. Referring to FIG. 7A, the first stage 750 of GUI 200 continues from the first stage 650 of FIG. 6A. Thus, the first stage 750 of GUI 200 shows UI item 210 as highlighted to indicate that application 110 is operating in the second mode. In addition, the first stage 750 illustrates GUI 200 after the user of application 110 starts providing a touch-based gesture input through the touch-based display of client device 105 for selecting multiple bars in the bar chart of chart visualization 205. In this example, the user of application 110 started the gesture input by touching the touch-based display at a location in the bar chart of chart visualization 205, holding the touch at the location for a defined amount of time (e.g., 200 ms, 500 ms, 1 second, etc.), and then dragging around the bar chart area of chart visualization 205. When application 110 is receiving the gesture input, application 110 is forwarding the gesture input to input manager 115. Upon receiving the gesture input, input manager 115 translates the gesture input as a multi-select operation and notifies application 110 of the operation. In response, application 110 displays a shape formed based on the location at which the gesture input was started and the location currently being touched. The shape used in this example is a rectangle. One of ordinary skill in the art will understand that any number of different shapes (e.g., an oval, an ellipse, a triangle, etc.) may be used. As illustrated in FIG. 7A, the location at which the gesture input was started and the location currently being touched are diagonally opposed corners of the rectangle. Next, application 110 determines the bars in the bar chart of chart visualization 205 that intersect the rectangle and highlights the bars to indicate that the bars will be selected. As shown in the first stage 750, the bars intersecting the rectangle formed based on the gesture input include the bars representing the Scottsdale, Tucson, and Kirkland locations Referring to FIG. 7B, the second stage 755 illustrates GUI 200 after the user of application 110 continued the gesture input described above for the first stage 750. In particular, the second stage 755 illustrates GUI 200 after the user continued to drag the touch in the bar chart of chart visualization. When application 110 is receiving the gesture input, application 110 is forwarding the gesture input to input manager 115. Once input manager 115 receives the gesture input, input manager 115 translates the gesture input as a multi-select operation and notifies application 110 of the operation. In response, application 110 updates the rectangle so that the location at which the gesture input was started and the location currently being touched are the diagonally opposed corners of the rectangle. As shown in the second stage 755, application 110 has updated the rectangle for selecting the bars so that the location at which the gesture input was started and the location currently being touched are the diagonally opposed corners of the rectangle. Application 110 then determines the bars in the bar chart of chart visualization 205 that intersect the rectangle and highlights the bars to indicate that the bars will be selected. As illustrated in the second stage 755, the bars intersecting the rectangle formed based on the gesture input include the bars representing the Scottsdale, Tucson, Kirkland, Spokane, Bellevue, Tacoma, and Seattle locations.

Referring to FIG. 7C, the third stage 760 illustrates GUI 200 after the user of application 110 ended the gesture input described above for stages 750 and 755. For this example, the user of application 110 ended the gesture input by ceasing to touch (e.g., lifting a finger used to touch) the touch-based display of client device 105. When application 110 receives the end of the gesture input, application 110 selects the bars that were intersecting the rectangle formed by the gesture input and stops displaying the rectangle. As shown in the third stage 760, the bars representing the Scottsdale, Tucson, Kirkland, Spokane, Bellevue, Tacoma, and Seattle locations were intersecting the rectangle when the user of application 110 ended the gesture input. Thus, application 110 selects these bars, as indicated by a highlighting of the bars in chart visualization 205.

The operations described above by reference to FIGS. 6A-6D and 7A-7C illustrate examples of multi-select operations. After a user of application 110 selects multiple data points (e.g., bars in a bar chart) in a chart visualization, the application 110 may provide additional details about the selected data points (e.g., aggregate values of the selected data points). In some embodiments, the user may perform a number of different operations on the selected data points. For instance, the application 110 allows the user to exclude the selected data points from the chart visualization, filter the data to only include the selected data points, zoom into the selected data points, etc.

Figure 8:
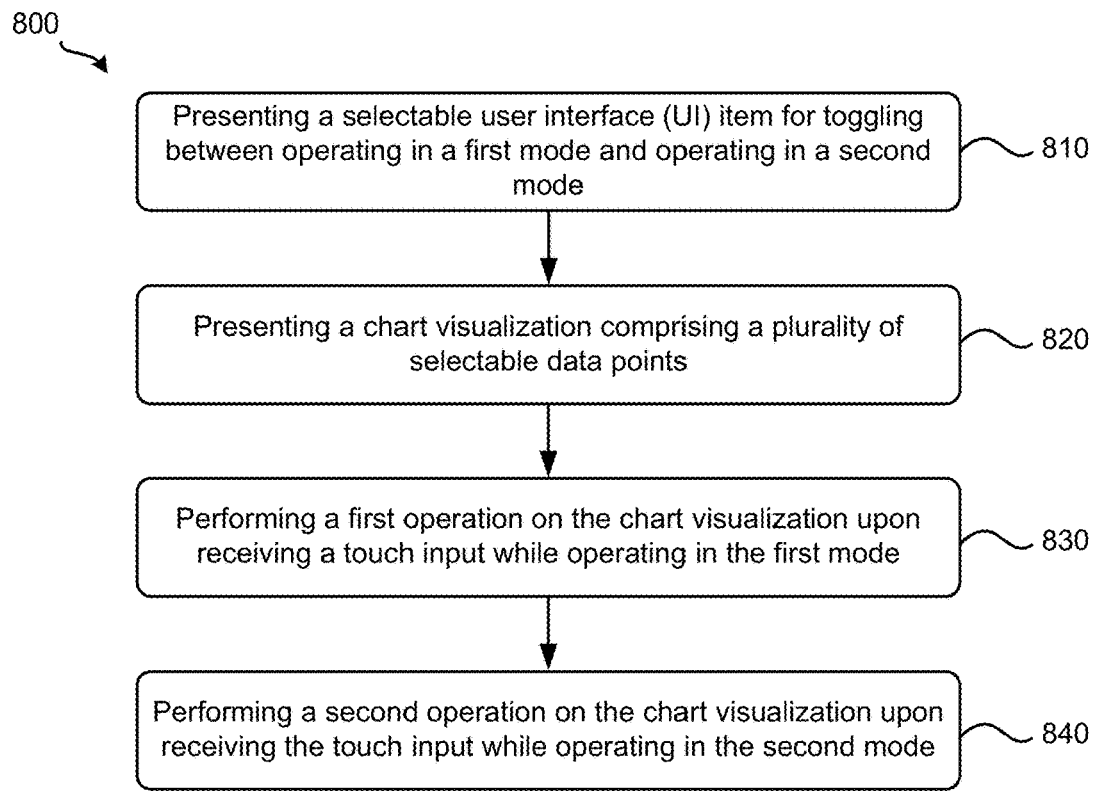
FIG. 8 illustrates a process for providing a chart visualization according to some embodiments.

FIG. 8 illustrates a process 800 for providing a chart visualization according to some embodiments. In some embodiments, client device 105 performs process 800. Process 800 begins by presenting, at 810, a selectable UI item for toggling between operating in a first mode and operating in a second mode. Referring to FIG. 2A as an example, application 110 may presents GUI 200. As shown, GUI 200 includes selectable UI item 210, which is configured to, upon selection, toggle between a first operating mode of application 110 and a second operating mode of application 110.

Next, process 800 presents, at 820, a chart visualization comprising a plurality of selectable data points. Referring to FIGS. 3-7 as an example, application 110 presents GUI 200, which includes chart visualization 205. Chart visualization 205 includes a bar chart with bars that are selectable. Then, process 800 performs, at 830, a first operation on the chart visualization upon receiving a touch input while operating in the first mode. Referring to FIG. 3 as an example, application 110 performs a single select operation on a bar in the bar graph of chart visualization 205 upon receiving a tap gesture input while application 110 is operating in the first mode, as indicated by UI item 210 not being highlighted.

Finally, process 800 performs, at 840, a second operation on the chart visualization upon receiving the touch input while operating in the second mode. Referring to FIG. 6C as an example, application 110 performs a multi-select operation on a second bar in the bar graph of chart visualization 205 upon receiving a tap gesture input while application 110 is operating in the second mode, as indicated by UI item 210 being highlighted. Referring to FIG. 6C as another example, application 110 performs a multi-select operation on a third bar in the bar graph of chart visualization 205 upon receiving a tap gesture input while application 110 is operating in the second mode, as indicated by UI item 210 being highlighted. The examples provided above for operations 830 and 840 illustrate that, for a tap gesture, application 110 performs a single select operating while operating in the first mode and performs a multi-select operation while operating in the second mode for these examples). One of ordinary skill in the art will appreciate that application 110 may perform different operations while operating in different modes for any number of different inputs.

Figure 9:
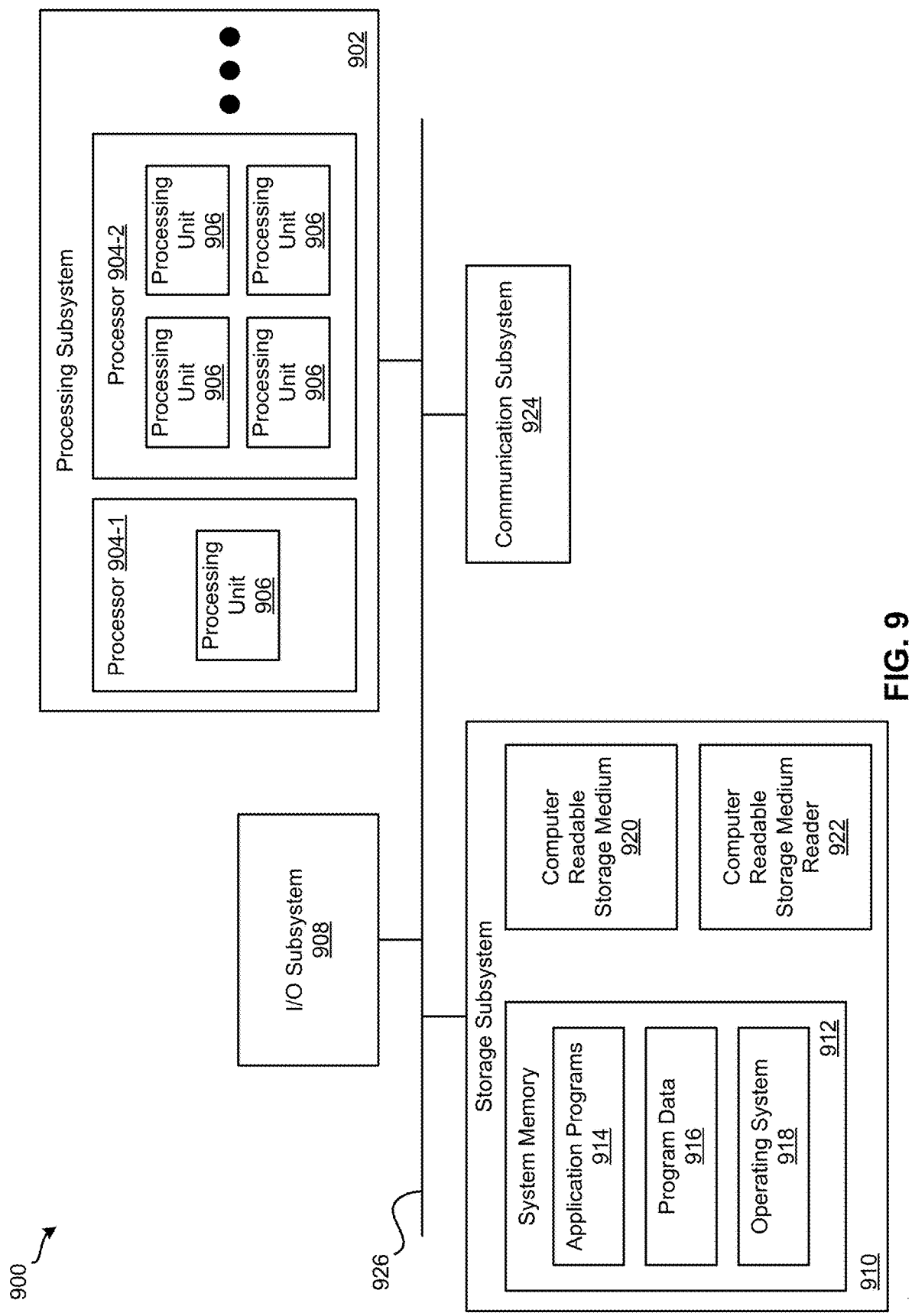
FIG. 9 illustrates an exemplary computer system, in which various embodiments may be implemented.

FIG. 9 illustrates an exemplary computer system 900 for implementing various embodiments described above. For example, computer system 900 may be used to implement client device 105 and computing system 125. Computer system 900 may be a desktop computer, a laptop, a server computer, or any other type of computer system or combination thereof. Some or all elements of application 110, input manager 115, application 125, or combinations thereof can be included or implemented in computer system 900. In addition, computer system 900 can implement many of the operations, methods, and/or processes described above (e.g., process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 800.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., application 110 or application 125), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., application 110, input manager 115, and application 125) and/or processes (e.g., process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
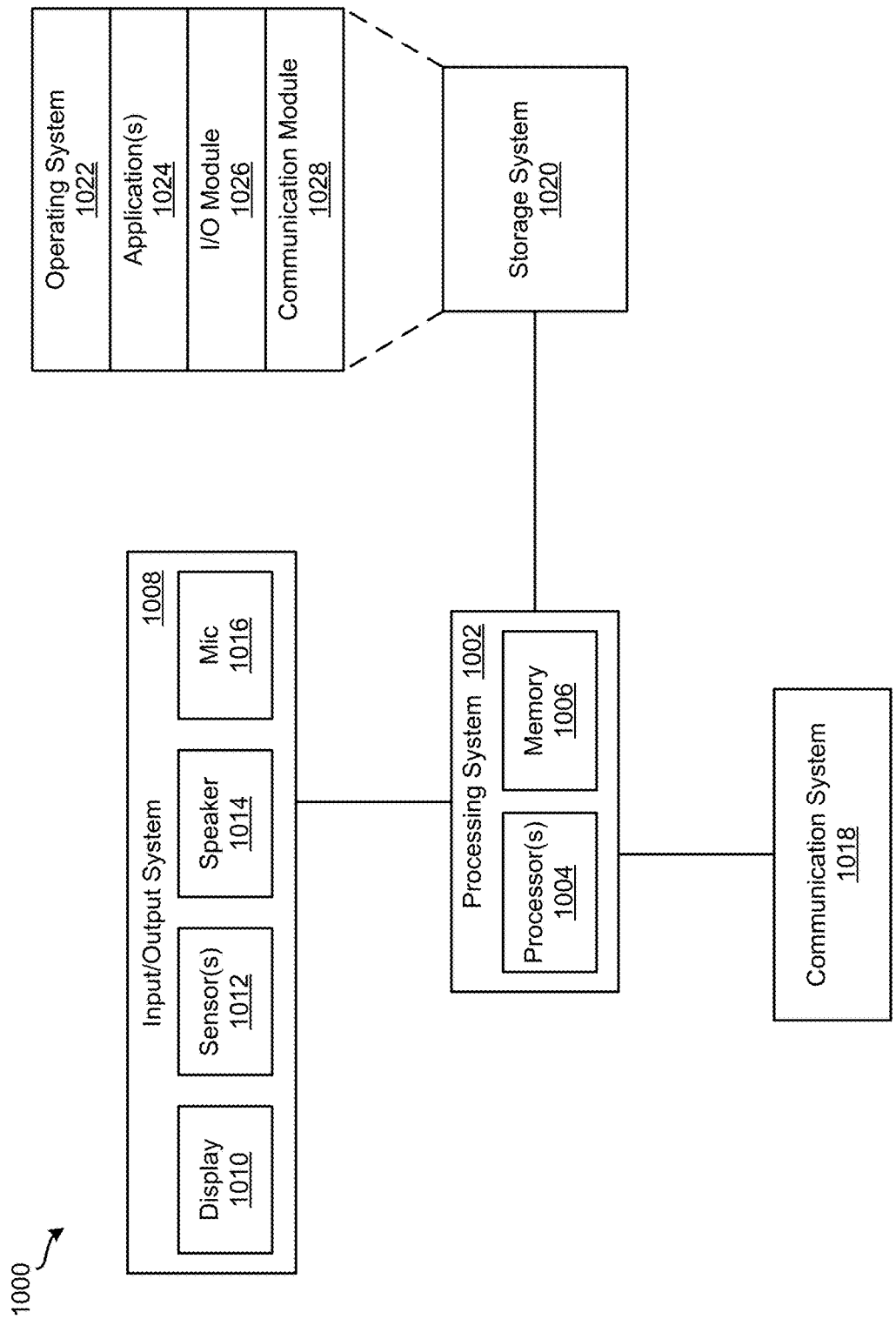
FIG. 10 illustrates an exemplary computing device, in which various embodiments may be implemented.

FIG. 10 illustrates an exemplary computing device 1000 for implementing various embodiments described above. For example, computing device 1000 may be used to implement client device 105. Computing device 1000 may be a cellphone, a smartphone, a wearable device, an activity tracker or manager, a tablet, a personal digital assistant (PDA), a media player, or any other type of mobile computing device or combination thereof. Some or all elements of application 110, input manager 115, or combinations thereof can be included or implemented in computing device 1000. In addition, computing device 1000 can implement many of the operations, methods, and/or processes described above (e.g., process 800). As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software. Many of the components (e.g., application 110 and input manager 115) and/or processes (e.g., process 800) described above may be implemented as software that when executed by a processor or processing unit (e.g., processors 1004 of processing system 1002) performs the operations of such components and/or processes.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. For example, application 110 may be installed on computing device 1000. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
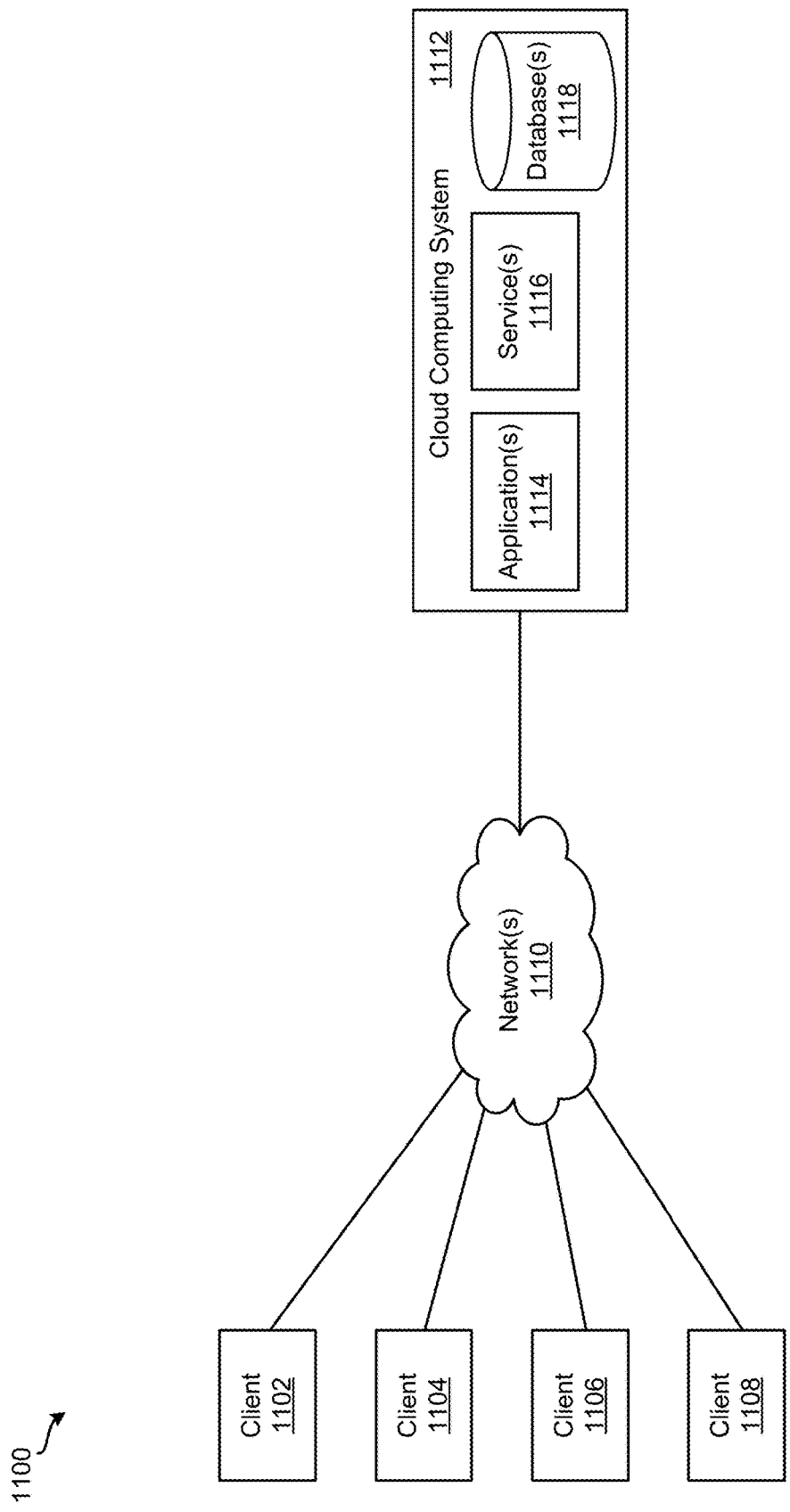
FIG. 11 illustrates system for implementing various embodiments described above.

FIG. 11 illustrates an exemplary system 1100 for implementing various embodiments described above. For example, cloud computing system 1112 of system 1100 may be used to implement computing system 125 and one of client devices 1102-1108 may be used to implement client device 105. As shown, system 1100 includes client devices 1102-1108, one or more networks 1110, and cloud computing system 1112. Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically provision, manage, and track a customer's subscriptions to services offered by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, storage 130 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:

sending a computing system a request for a chart visualization of data from a data model, the data model comprising a set of measures and a set of dimensions used for categorizing the set of measures;

receiving the chart visualization from the computing system, the chart visualization generated by the computing system based on data managed by the computing system;

presenting, on a touch-based display of the device, a selectable user interface (UI) item for toggling between operating in a first operating mode of an application operating on the device and operating in a second operating mode of the application operating on the device, wherein receiving, via the touch-based display of the device, a selection of the selectable UI item causes the application to transition from operating in one of the first and second operating modes to operating in the other of the first and second operating modes;

presenting, on the touch-based display of the device, the chart visualization, the chart visualization comprising a plurality of selectable data points, each data point in the plurality of data points comprising a value of a measure in the set of measures and a value of a dimension in the set of dimensions;

receiving, via the touch-based display of the device, an initial touch input;

upon receiving, via the touch-based display of the device, a subsequent touch input while the application is operating in the first operating mode, performing a first operation on the chart visualization comprising a type of single select operation; and upon receiving, via the touch-based display of the device, the subsequent touch input while the application is operating in the second operating mode, performing a second, different operation on the chart visualization comprising a type of multi-select operation;

wherein the first and second operating modes are configured to translate the subsequent touch input differently.

2. The non-transitory machine-readable medium of claim 1, wherein the subsequent touch input comprises a plurality of consecutive tap gestures on a subset of data points in the plurality of data points, wherein the first operation comprises a plurality of consecutive selections of a corresponding data point in the plurality of data points, wherein the second operation comprises a selection of the subset of data points in the plurality of data points and a presentation of a sum of the values of the measures of the subset of data points within the chart visualization.

3. The non-transitory machine-readable medium of claim 1, wherein the subsequent touch input comprises touching a first location on the touch-based display of the device for a defined amount of time and then dragging from the first location to a second location on the touch-based display of the device, wherein the first operation comprises a selection of a data point in the plurality of data points nearest the second location, wherein the second operation comprises a selection of the subset of data points in the plurality of data points that intersect an area defined by the first location and the second location.

4. The non-transitory machine-readable medium of claim 1, wherein the program further comprises sets of instructions for:

receiving, via the touch-based display of the device, a third touch input comprising a drag gesture; and in response to the third touch input, performing a scroll operation on the chart visualization.

5. The non-transitory machine-readable medium of claim 1, wherein the program further comprises sets of instructions for:

receiving, via the touch-based display of the device, a third touch input comprising a first selection of a first data point in the plurality of data points;

receiving, via the touch-based display of the device, a fourth touch input comprising a second selection of a second data point in the plurality of data points; and in response to the third and fourth touch inputs, presenting, on the touch-based display of the device, a comparison between the first data point and the second data point.

6. The non-transitory machine-readable medium of claim 5, wherein the third touch input comprises a tap gesture on the first data point.

7. The non-transitory machine-readable medium of claim 5, wherein the fourth touch input comprises touching a first location on the touch-based display of the device for a defined amount of time and dragging from the first location to a second location on the touch-based display of the device, wherein the second data point is the nearest data point in the plurality of data points to the second location.

8. A method, executable by a device, comprising:

sending a computing system a request for a chart visualization of data from a data model, the data model comprising a set of measures and a set of dimensions used for categorizing the set of measures;

receiving the chart visualization from the computing system, the chart visualization generated by the computing system based on data managed by the computing system;

presenting, on a touch-based display of the device, a selectable user interface (UI) item for toggling between operating in a first operating mode of an application operating on the device and operating in a second operating mode of the application operating on the device, wherein receiving, via the touch-based display of the device, a selection of the selectable UI item causes the application to transition from operating in one of the first and second operating modes to operating in the other of the first and second operating modes;

presenting, on the touch-based display of the device, the chart visualization, the chart visualization comprising a plurality of selectable data points, each data point in the plurality of data points comprising a value of a measure in the set of measures and a value of a dimension in the set of dimensions;

receiving, via the touch-based display of the device, an initial touch input;

upon receiving, via the touch-based display of the device, a subsequent touch input while the application is operating in the first operating mode, performing a first operation on the chart visualization comprising a type of single select operation; and upon receiving, via the touch-based display of the device, the subsequent touch input while the application is operating in the second operating mode, performing a second, different operation on the chart visualization comprising a type of multi-select operation;

wherein the first and second operating modes are configured to translate the subsequent touch input differently.

9. The method of claim 8, wherein the subsequent touch input comprises a plurality of consecutive tap gestures on a subset of data points in the plurality of data points, wherein the first operation comprises a plurality of consecutive selections of a corresponding data point in the plurality of data points, wherein the second operation comprises a selection of the subset of data points in the plurality of data points and a presentation of a sum of the values of the measures of the subset of data points within the chart visualization.

10. The method of claim 8, wherein the subsequent touch input comprises touching a first location on the touch-based display of the device for a defined amount of time and then dragging from the first location to a second location on the touch-based display of the device, wherein the first operation comprises a selection of a data point in the plurality of data points nearest the second location, wherein the second operation comprises a selection of the subset of data points in the plurality of data points that intersect an area defined by the first location and the second location.

11. The method of claim 8, wherein the method further comprises:
receiving, via the touch-based display of the device, a third touch input comprising a drag gesture; and
in response to the third touch input, performing a scroll operation on the chart visualization.

12. The method of claim 8, wherein the method further comprises:
receiving, via the touch-based display of the device, a third touch input comprising a first selection of a first data point in the plurality of data points;
receiving, via the touch-based display of the device, a fourth touch input comprising a second selection of a second data point in the plurality of data points; and
in response to the third and fourth touch inputs, presenting, on the touch-based display of the device, a comparison between the first data point and the second data point.

13. The method of claim 12, wherein the third touch input comprises a tap gesture on the first data point.

14. The method of claim 12, wherein the fourth touch input comprises touching a first location on the touch-based display of the device for a defined amount of time and dragging from the first location to a second location on the touch-based display of the device, wherein the second data point is the nearest data point in the plurality of data points to the second location.

15. A system comprising:
a touch-based display;
a set of processing units; and
a non-transitory computer-readable medium storing instructions that when executed by at least one processing unit in the set of processing units cause the at least one processing unit to:
send a computing system a request for a chart visualization of data from a data model, the data model comprising a set of measures and a set of dimensions used for categorizing the set of measures;
receive the chart visualization from the computing system, the chart visualization generated by the computing system based on data managed by the computing system;
present, on a touch-based display of the system, a selectable user interface (UI) item for toggling between operating in a first operating mode of an application operating on the system and operating in a second operating mode of the application operating on the system, wherein receiving, via the touch-based display of the system, a selection of the selectable UI item causes the application to transition from operating in one of the first and second operating modes to operating in the other of the first and second operating modes;
present, on the touch-based display of the system, the chart visualization, the chart visualization comprising a plurality of selectable data points, each data point in the plurality of data points comprising a value of a measure in the set of measures and a value of a dimension in the set of dimensions;
receive, via the touch-based display of the device, an initial touch input;
upon receiving, via the touch-based display of the system, a subsequent touch input while the application is operating in the first operating mode, perform a first operation on the chart visualization comprising a type of single select operation; and
upon receiving, via the touch-based display of the system, the subsequent touch input while the application is operating in the second operating mode, perform a second, different operation on the chart visualization comprising a type of multi-select operation;
wherein the first and second operating modes are configured to translate the subsequent touch input differently.

16. The system of claim 15, wherein the subsequent touch input comprises a plurality of consecutive tap gestures on a subset of data points in the plurality of data points, wherein the first operation comprises a plurality of consecutive selections of a corresponding data point in the plurality of data points, wherein the second operation comprises a selection of the subset of data points in the plurality of data points and a presentation of a sum of the values of the measures of the subset of data points within the chart visualization.

17. The system of claim 15, wherein the subsequent touch input comprises touching a first location on the touch-based display of the system for a defined amount of time and then dragging from the first location to a second location on the touch-based display of the system, wherein the first operation comprises a selection of a data point in the plurality of data points nearest the second location, wherein the second operation comprises a selection of the subset of data points in the plurality of data points that intersect an area defined by the first location and the second location.

18. The system of claim 15, wherein the instructions further cause the at least one processing unit to:
receive, via the touch-based display of the system, a third touch input comprising a drag gesture; and
in response to the third touch input, perform a scroll operation on the chart visualization.

19. The system of claim 15, wherein the instructions further cause the at least one processing unit to:
receive, via the touch-based display of the system, a third touch input comprising a first selection of a first data point in the plurality of data points;
receive, via the touch-based display of the system, a fourth touch input comprising a second selection of a second data point in the plurality of data points; and
in response to the third and fourth touch inputs, present, on the touch-based display of the system, a comparison between the first data point and the second data point.

20. The system of claim 15, wherein the third touch input comprises a tap gesture on the first data point, wherein the fourth touch input comprises touching a first location on the touch-based display of the system for a defined amount of time and dragging from the first location to a second location on the touch-based display of the system, wherein the second data point is the nearest data point in the plurality of data points to the second location.

* * * * *